United States Patent
Nair et al.

(10) Patent No.: US 12,502,865 B2
(45) Date of Patent: Dec. 23, 2025

(54) PATTERNED LIGHT-BLOCKING ELEMENTS

(71) Applicant: Eastman Kodak Company, Rochester, NY (US)

(72) Inventors: Mridula Nair, Penfield, NY (US); Peter G. Bessey, Clifton Springs, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 317 days.

(21) Appl. No.: 17/989,019

(22) Filed: Nov. 17, 2022

(65) Prior Publication Data
US 2024/0165910 A1    May 23, 2024

(51) Int. Cl.
*B32B 3/24*    (2006.01)
*B32B 3/26*    (2006.01)
*B32B 3/30*    (2006.01)
*B32B 5/18*    (2006.01)
*B32B 5/24*    (2006.01)
*B32B 27/06*   (2006.01)
*B32B 27/20*   (2006.01)

(52) U.S. Cl.
CPC ............ *B32B 3/30* (2013.01); *B32B 3/266* (2013.01); *B32B 5/18* (2013.01); *B32B 5/245* (2013.01); *B32B 27/065* (2013.01); *B32B 27/20* (2013.01); *B32B 2262/0261* (2013.01); *B32B 2262/0276* (2013.01); *B32B 2262/062* (2013.01); *B32B 2264/0214* (2013.01); *B32B 2264/101* (2013.01); *B32B 2266/0214* (2013.01); *B32B 2307/402* (2013.01); *Y10T 428/24273* (2015.01); *Y10T 428/24331* (2015.01)

(58) Field of Classification Search
CPC ...................................... B32B 3/266
See application file for complete search history.

(56) References Cited

U.S. PATENT DOCUMENTS

| | | | |
|---|---|---|---|
| 4,677,016 A | 6/1987 | Ferziger et al. | |
| 5,741,582 A | 4/1998 | Leaderman et al. | |

(Continued)

FOREIGN PATENT DOCUMENTS

| | | |
|---|---|---|
| CN | 202175850 U | 3/2012 |
| CN | 204862231 U | 12/2015 |

(Continued)

*Primary Examiner* — William P Watkins, III
(74) *Attorney, Agent, or Firm* — J. Lanny Tucker

(57) ABSTRACT

Patterned light-blocking elements are prepared using a method having operations A') through F'), or a method having operations A") through G"). Such methods include providing an ii) embossed and densified foamed opacifying layer on the back side of a i) fabric and a iii) non-foamed function composition on the ii) embossed and densified foamed opacifying layer. Embossing can be carried out using self-embossing or any suitable embossing means including a continuous embossing belt or web or an embossing roller or sleeve. The embossing operation provides a visible relief pattern in the ii) embossed and densified foamed opacifying layer that can be viewed from the face side of the patterned light-blocking element when appropriately backlit as a transmissive display in a darkened environment. Such elements can be used as window treatments as well as decorative fabrics in various environments.

20 Claims, 6 Drawing Sheets

(56) References Cited

U.S. PATENT DOCUMENTS

| | | |
|---|---|---|
| 6,189,592 B1 | 2/2001 | Domel |
| 6,541,138 B2 | 4/2003 | Bullock et al. |
| 6,884,491 B2 | 4/2005 | Rubin et al. |
| 7,754,409 B2 | 7/2010 | Nair et al. |
| 7,887,984 B2 | 2/2011 | Nair et al. |
| 8,252,414 B2 | 8/2012 | Putnam et al. |
| 8,329,783 B2 | 12/2012 | Nair et al. |
| 9,469,738 B1 | 10/2016 | Nair et al. |
| 9,963,569 B2 | 5/2018 | Nair et al. |
| 11,181,247 B2 | 11/2021 | Nair |
| 2018/0223474 A1 | 8/2018 | Nair et al. |
| 2019/0390027 A1 | 12/2019 | Nair et al. |
| 2019/0390028 A1 | 12/2019 | Lobo et al. |
| 2019/0390029 A1 | 12/2019 | Nair et al. |
| 2020/0216632 A1* | 7/2020 | Nair ................. C08K 3/04 |
| 2020/0317929 A1 | 10/2020 | Nair et al. |
| 2021/0087350 A1* | 3/2021 | Nair ............... D06N 3/0065 |
| 2021/0189640 A1 | 6/2021 | Nair et al. |
| 2021/0189641 A1 | 6/2021 | Nair et al. |
| 2021/0190289 A1 | 6/2021 | Nair |
| 2021/0300265 A1* | 9/2021 | Piccin ................ B32B 9/007 |

FOREIGN PATENT DOCUMENTS

| | | |
|---|---|---|
| CN | 106335231 A | 1/2017 |
| CN | 106808756 A | 6/2017 |
| CN | 108589094 A | 9/2018 |
| CN | 210123142 U | 3/2020 |
| DE | 10 2017 101981 A1 | 8/2018 |
| DE | 10 2013 012201 B4 | 7/2022 |
| GB | 1221649 | 2/1971 |
| JP | 2005029946 A | 2/2005 |
| JP | 5701988 B2 | 4/2015 |
| TW | 586280 U | 11/2019 |
| WO | 20211/26726 A1 | 6/2021 |
| WO | 20211/26727 A1 | 6/2021 |

* cited by examiner

PATTERNED LIGHT-BLOCKING ELEMENTS

RELATED APPLICATIONS

Reference is made to the following co-pending and commonly assigned patent application:

U.S. Ser. No. 17/989,040 filed on Nov. 17, 2022, by Nair and Bessey, and entitled "Method of Making Patterned Light-Blocking Elements"; and U.S. Ser. No. 17/989,070 filed on Nov. 17, 2022, by Nair, Bessey, and Lobo, and entitled "Method for Making Patterned Light-Blocking Elements", the disclosures of both of which are incorporated herein by reference.

FIELD OF THE INVENTION

This invention relates generally to patterned light-blocking elements that can be used as backlit transmissive display elements that provide illuminated patterns for aesthetically enhancing the surroundings, such as visually pleasing light effects and patterns. These patterned light-blocking elements can be prepared using fabrics having prefabricated visible relief patterns for self-embossing. Alternatively, the patterned light-blocking elements can be formed during manufacture using suitable embossing means.

BACKGROUND OF THE INVENTION

Illuminated signage and display boards are popular in general. These signs usually incorporate discrete backlighting which has the effect of illuminating the sign. A backlit sign may consist of laser-cut panel(s) made of wood or metal and backing material of light diffusing acrylic. Backlit laser perforated display elements have been used for many years to provide aesthetically pleasing mood lighting. Even today, there still exists a continuing demand and need for illumination devices that provide visually pleasing illumination effects and light patterns.

In general, when light strikes a surface, some light may be reflected, some absorbed, some scattered, and the rest transmitted. An opaque substance transmits almost no light, and therefore reflects, scatters, or absorbs all of it. "Blackout" or light-blocking materials typically refer to coated layers in articles that are substantially impermeable to light such as visible electromagnetic radiation. Thus, when a blackout material such as a blackout curtain or shade is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be provided. Light-blocking articles such as the blackout curtains or shades can be comprised of a fabric substrate coated with more than one layer of a foamed composition.

A method that is practiced for producing such blackout materials is to sandwich a light-absorbing, foamed black pigmented layer, such as one or more carbon black layer between two foamed light scattering, white pigment-containing layers. However, when a radiation-blocking coating has, as it often does, a strongly light absorbing material containing black pigments such as carbon black, between two reflective layers, it has at least two distinct problems. First, such materials require three or more separate coating operations that reduce manufacturing productivity and increase energy and water usage and has a higher carbon footprint. Secondly, carbon black in the light absorbing middle layer can become "fugitive" (or non-enclosed) from a puncture or tear occurring during sewing or laundering of the fabric, and soil other layers such as reflective layers, which is highly objectionable, not to mention the potential carcinogenicity of free carbon black. Additionally, the stitches generated in the materials during sewing can cause fugitive carbon to spread over a larger area thereby increasing the area of objectionable shading of the light-colored surface. Further, such materials provide only one level of light blocking when the fabric is coated. Varying degrees of light blocking (tunability) cannot be designed into these materials.

To address the noted problems, considerable innovation has been achieved and is described in U.S. Pat. No. 7,754,409 (Nair et al.), U.S. Pat. No. 7,887,984 (Nair et al.), U.S. Pat. No. 8,252,414 (Putnam et al.), U.S. Pat. No. 8,329,783 (Nair et al.), U.S. Pat. No. 9,469,738 (Nair et al.), and U.S. Pat. No. 9,963,569 (Nair et al.), and of U.S. Patent Application Publications 2018/0223474 (Nair et al), 2021/0189641 (Nair et al.), and 2021/0190289 (Nair). Porous polymer particles having discrete pores and made by a multiple emulsion process, were combined with other materials including opacifying colorants in foamed opacifying layers in light-blocking elements or other decorative articles.

Other light-blocking elements are described in U.S. Patent Application Publications 2019/0390027 (Nair et al.), 2019/0390028 (Lobo et al.), and 2019/0390029 (Nair et al.), which light-blocking elements have a functional layer containing spacer particles, disposed over a foamed opacifying layer on one side of a fabric.

Patterning fabrics is well known in the textile and wall-covering industries, some of which may also provide some opacity control. Some fabric lamp shades have also been patterned for aesthetic purposes. Patterned fabrics have been used to make roll up shades, as described for example in U.S. Pat. No. 6,189,592 (Domel) in which multiple patterned shades are combined with separated rollers to provide different opacities.

In the hospitality industry there is a continuing demand for design elements such as improved appearance, functionality, and aesthetics for environmental lighting and furnishings including drapes, wall coverings, and the like. One interest that receives a lot of attention is mood lighting. Fulfilling this need presents an ongoing challenge for creative solutions. Aesthetic appeal can be quickly compromised if there are too many focal points and distractions. But if a fabric could be designed, for example, to function as a decorative panel in bright light and also to provide aesthetically pleasing mood lighting in a darkened or dimly lit space, an advance in the art could be achieved. While backlit laser engraved or perforated metal panels can create aesthetic light output, because they are metallic, they do not have the tactile experience and appearance of a fabric that is pleasing for many interior environments, especially in room or ambient light.

Metallic backlit articles are not suitable for many situations and environments where fabrics are required or desired, and there is a need to find suitable alternatives for light-blocking and backlighting simultaneously. The present invention is directed to providing these alternatives.

SUMMARY OF THE INVENTION

The present invention provides a patterned light-blocking element consisting essentially of:

i) a fabric having a face side and a back side;

ii) an embossed and densified foamed opacifying layer that is disposed on the back side of the i) fabric, the ii) embossed and densified foamed opacifying layer having a visible relief pattern of raised regions and recessed regions, such that in low ambient lighting conditions, backlighting impacting the ii) embossed and densified foamed opacifying layer is blocked everywhere except in at least some of the recessed regions of the visible relief pattern, and such that an outline of the visible relief pattern in the ii) embossed and densified foamed opacifying layer is visible when viewed from the face side of the i) fabric; and iii) a non-foamed functional composition disposed on the ii) embossed and densified foamed opacifying layer at a coverage of at least 0.5 g/m² and up to and including 10 g/m², wherein the ii) embossed and densified foamed opacifying layer comprises:

(a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 µm and up to and including 50 µm and a porosity of at least 20 volume % and up to and including 70 volume %;

(b') a binder matrix that is present in an amount of at least 10 weight % and up to and including 80 weight %;

(c) two or more additives that are present in a total amount of at least 0.0001 weight % and up to and including 50 weight %, the two or more additives comprising at least one foaming surfactant and at least one compound that is a foam stabilizer; and (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm, all amounts of the (a) porous particles, (b') binder material, (c) two or more additives, and (e) opacifying colorant being based on the total weight of the ii) embossed and densified foamed opacifying layer, wherein the iii) non-foamed functional composition comprises: (aa) glass particles or organic polymeric particles having a mode particle size of at least 5 µm and up to and including 100 µm, in an amount of at least 5 weight % and up to and including 99 weight %, based on the total weight of the iii) non-foamed functional composition; and (ad) one or more water-soluble or water-dispersible organic polymeric binders, and wherein the optical density of the patterned light-blocking element is greater than 4 in regions outside of the recessed regions of the visible relief pattern.

The present invention provides patterned light-blocking elements that can be backlit to provide a pleasing or aesthetic appearance to a viewer from the front side (or fabric side) of the element. Unlike metallic patterns that are backlit, the patterned light-blocking elements of the present invention have the pleasurable tactile experience, look, and overall appeal of fabric window treatments such as draperies and curtains that can be used in front of windows, or on ceilings, or as wall coverings.

Such inventive patterned light-blocking elements have an ii) embossed and densified foamed opacifying layer disposed on the back side of a i) fabric that can have, for example a visible relief pattern (such as a motif), on its face side. In some embodiments (inventive Method I), a prefabricated visible relief pattern can be used to provide, through self-embossing, a visible relief pattern in the ii) embossed and densified foamed opacifying layer, which visible relief pattern has both raised regions and recessed regions and, backlighting that visible relief pattern in ii) the embossed and densified foamed opacifying layer in a dark or dimly lit environment provides a visible light pattern on the face side of the i) fabric.

Patterned light-blocking elements of this invention can also be prepared by forming a visible relief pattern in the ii) embossed and densified foamed opacifying layer during an embossing operation using an external embossing means, for example as described below for inventive Method II and inventive Method III. Additionally, when the visible relief pattern is formed according to the inventive methods, the outline of the visible relief pattern is readily visible when viewed from the face side of the i) fabric when the patterned light-blocking element is backlit, for example, in a darkened or dimly lit room.

Such inventive patterned light-blocking elements having these selectively light transmissive regions, can be used as designed materials that can provide aesthetically pleasing backlit display patterns on walls, ceilings, or windows in a dimly lit environment but that during the day or in bright ambient light can function as shades, curtains, and wall coverings. They may also be used to block excessive outside light while being capable of providing a backlit image or pattern viewed inside a darkened room.

Several method methods can be used to form such inventive patterned light-blocking elements. Method I utilizes a i) fabric already having a prefabricated visible relief pattern on one side (face) thereof to self-emboss the foamed opacifying layer on the back side during densification. Methods II and III utilize i) fabric that does not have a prefabricated visible relief pattern, but a visible relief pattern can be provided on the foamed opacifying layer using an embossing operation, either before or after a curing operation, and a suitable embossing means such as an embossing pressure roller, embossing sleeve, sheet of embossing fabric, or a continuous patterned embossing web or belt as described below.

Another advantage provided according to the inventive patterned light-blocking elements and methods for making them, is the capability of providing anticounterfeit design elements, for example by forming a unique logo, design, motif, or identifying image along an edge of an ii) embossed and densified foamed opacifying layer, or in another part of the patterned light-blocking element, which unique logo, design, motif, or identifying image can be removed if needed by a user when the inventive patterned light-blocking elements are finished into draperies, curtains, shades, or other wall coverings.

A further advantage is that the inventive patterned light-blocking elements and methods for making them can be achieved using a single ii) embossed and densified foamed opacifying layer, and not with any other prior art configurations such as for example, the construction having multiple foamed white layers sandwiching a foamed black opacifying layer that are used in a multi-layer package in prior art opacifying elements. The multiple foamed layers and attendant densification steps would prevent the embossing described in the present invention from producing the desired patterned light-blocking elements.

DETAILED DESCRIPTION OF THE INVENTION

Figure 2:
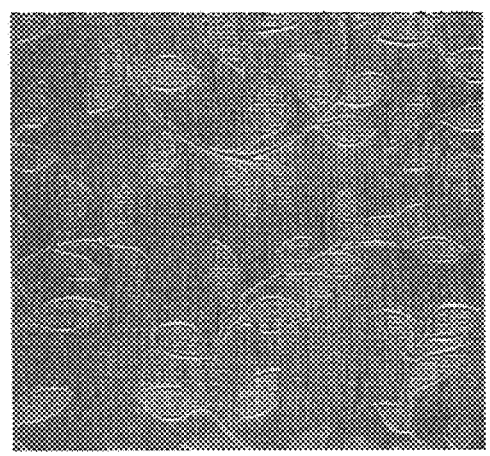
FIG. 2 is a black-and-white image of the inventive patterned light-blocking element described in Example 1 below, as viewed in ambient light from the face side of a i) fabric having a prefabricated visible relief pattern.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the foamed aqueous opacifying composition, foamable aqueous opacifying composition, non-foamed functional composition, and various dried layers of elements formed therefrom, unless otherwise indicated, the singular forms "a," "an," and "the" are intended to include one or more of the components (that is, a singular reference can include plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the "foamable aqueous opacifying composition" and "foamed aqueous opacifying composition" are different from a "iii) non-foamed functional composition" and "non-foamed functional composition formulation" as described below.

The terms (a) "porous particle" and (a) "porous particles" are used herein, unless otherwise indicated, to refer to porous organic polymeric materials useful in the foamable aqueous compositions, foamed aqueous opacifying compositions, and ii) embossed and densified cured foamed opacifying layers. The (a) porous particles generally comprise a solid continuous polymeric phase having an external particle surface and discrete pores dispersed within the continuous polymeric phase. The continuous polymeric phase of the (a) porous particles generally has the same composition or homogeneity, throughout that solid phase.

As used in this disclosure, the term "isolated from each other" refers to the different (discrete) pores of same or different sizes that are separated from each other by some material of the continuous polymeric phase, and such pores are not interconnected. Thus, "discrete" pores refer to "individual" or "closed," non-connected pores or voids distributed within the continuous polymeric phase.

The (a) porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the (a) porous particles can include discrete pores of all sizes and shapes (that is, discrete pores entirely within the continuous polymeric phase) providing a suitable volume in each discrete pore, macro discrete pores are particularly useful. Open macro pores on the surface of the porous particle are not desirable and may be present only by accident. Typically, the discrete pores independently have an average size of at least 100 nm and up to and including 7,000 nm. Whatever the size of the discrete pores, they are generally distributed randomly throughout the continuous polymeric phase. Average pore size can be determined by SEM (Scanning Electron Microscopy) evaluations of particle cross-sections.

The (a) porous particles used in this invention generally have a porosity of at least 20 volume % or of at least 35 volume % or even of at least 40 volume %, and up to and including 60 volume % or up to and including 65 volume % or even up to and including 70 volume %, all based on the total porous particle volume. Porosity can be measured by a modification of the known mercury intrusion procedure where mercury is used to crush the closed pores at high pressure and the volume of the irreversibly crushed pores is used to measure porosity (or pore volume), for example, see the publication by Nair et al., "Colloids and Surfaces A: Physicochem. Eng. Aspects" 443 (2014) 583-595.

Glass transition temperatures of organic polymers used in the practice of the present invention, can be measured using Differential Scanning Calorimetry (DSC) at 10° C./min and 2 heating cycles. For many commercially available organic materials, the glass transition temperatures are often known from the suppliers.

Opacity in the patterned light-blocking elements of this invention can be evaluated in transmitted light that passes through outside the recessed regions of the visible relief pattern, by measuring its optical density (OD) using an apparatus consisting of a fiber optic Xenon light source, a computer controlled translational stage, and an optical photometer. The fiber optic can be positioned 10 mm above the surface of the fabric face side of the patterned light-blocking element. An optical photometer is then placed on the back side of the patterned light-blocking element (thus, behind the ii) embossed and densified foamed opacifying layer) directly under the fiber optic in order to quantify the amount of light that passes through the entire patterned light-blocking element. The optical density is then calculated by comparing the light that passes through the patterned light-blocking element, to the light that reaches the optical photometer when no patterned light-blocking element is present.

Unless otherwise indicated herein, the terms "face side" and "back side" in reference to the i) fabric described below refers to opposing sides thereof. The face side, also known in the art as the "right side" of the i) fabric is the side that is usually visible to a viewer that may for example, be inside a room, and the back side, also known in the art as the "wrong side", of the i) fabric is the side on which the foamed aqueous opacifying composition (or corresponding layer) is disposed and usually faces the window or the wall or the ceiling, depending on what it is against. In some embodiments of the present invention, a prefabricated visible relief pattern can be present on the face side of the i) fabric, for example using embroidery. During backlighting in a dimly light or dark room, a visible light pattern of the embossed foamed opacifying layer can be observed when viewing from the face side of the i) fabric.

Uses

The foamable aqueous compositions, foamed aqueous opacifying compositions, non-foamed functional composition formulations, i) fabric with prefabricated visible relief patterns, and i) fabric without prefabricated visible relief patterns described herein can be used to prepare inventive patterned light-blocking elements having the advantages described above that block visible electromagnetic radiation while having a designed visible relief pattern on the densified foamed opacifying layer that when illuminated or backlit, provides a visible aesthetic appearance on the opposite side in a dimly lit space. Such inventive patterned light-blocking elements can also exhibit improved sound and heat blocking properties and further provide a pleasing visual and tactile experience in ambient light.

Foamable Aqueous Opacifying Compositions

The foamable aqueous opacifying compositions useful in the practice of this invention can be suitably aerated (or "foamed") to provide foamed aqueous opacifying compositions, for example to prepare an ii) embossed and densified foamed opacifying layer (that is also cured at some point) in the patterned light-blocking elements according to the present invention as described below.

In many embodiments, each foamable aqueous compositions used in the present invention has five essential components. That is, only five components are needed to obtain the properties of the embossed and crushed foamed opacifying layer described herein: (a) porous particles as described below; (b) a binder material [that is transformed into (b') binder matrix], also described below; (c) two or more additives as described below, for example comprising at least one foaming surfactant and at least one compound that is a foam stabilizer; (d) an aqueous medium (described below); and (e) an opacifying colorant that is a different material from all of the (a) porous particles, (b) binder material, and (c) two or more additives. This opacifying colorant is chosen to absorb electromagnetic radiation generally in the UV and visible regions of the electromagnetic spectrum, for example, at wavelengths of at least 250 nm and up to and including 800 nm or at wavelengths of at least 350 nm and up to and including 700 nm.

The foamable aqueous opacifying composition generally has at least 35% or at least 40%, and up to and including 60% or up to and including 70%, solids.

(a) Porous Particles:

Porous particles used in the present invention containing discrete pores (or compartments or voids) are incorporated into each iii) embossed, densified, and cured foamed opacifying layer. They are generally prepared using one or more water-in-oil emulsions in combination with an aqueous suspension process, such as in the Evaporative Limited Coalescence (ELC) process that is known in the art. The details for the preparation of the (a) porous particles and many of useful details relating to foamable aqueous opacifying compositions are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), U.S. Pat. No. 8,252,414 (Putnam et al.), U.S. Pat. No. 10,920,032 (Nair et al), and U.S. Pat. No. 11,275,203 (Nair et al.), the disclosures of all of which are incorporated herein by reference. Thus, the (a) porous particles are generally polymeric and organic in nature (that is, the continuous polymeric phase is polymeric and organic in nature) and non-porous particles (having less than 5% porosity) are excluded from use in the present invention.

The (a) porous particles are composed of a continuous polymeric phase derived from one or more organic polymers that are chosen so that the combination of the one or more organic polymers of the continuous polymeric phase have a glass transition temperature ($T_g$) of greater than 80° C., or more typically of at least 100° C. and up to and including 180° C., or more likely at least 110° C. and up to and including 170° C. as determined using DSC. Polymers having a $T_g$ that is greater than 200° C. are typically less useful in the continuous polymeric phase because they exhibit limited solubility in the water-immiscible solvents such as ethyl acetate used for preparing the porous particles. Thus, if a mixture of organic polymers is used to form the continuous polymeric phase, this mixture of organic polymers, not necessarily each individual organic polymer, has the noted glass transition temperature.

In particularly useful embodiments, generally the continuous polymeric phase can be comprised of at least 70 weight % and up to and including 100 weight %, based on the total polymer weight in the continuous polymeric phase, of one or more cellulose polymers (or cellulosic polymers) including but not limited to, one or more cellulosic polymers derived from one or more (for example, a combination) of cellulose acetate, cellulose butyrate, cellulose acetate butyrate, and cellulose acetate propionate. It is also possible that cellulose polymers can be mixed with non-cellulose polymers to prepare the continuous polymeric phase, as long as all of the other requirements of the (a) porous particles are achieved. In some embodiments, the one or more cellulose polymers typically comprise at least 70 weight % of the total amount of organic polymers.

In general, the (a) porous particles used in the present invention have a mode particle size of at least 2 μm or of at least 3 μm, and up to and including 30 μm or up to and including 20 μm or up to and including 40 μm or even up to and including 50 μm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical.

Pore stabilizing materials such as hydrocolloids (for example, carboxymethyl cellulose, gelatin, or polyvinyl alcohol) can be present within at least part of the volume of the discrete pores distributed throughout the continuous polymeric phase, which pore stabilizing materials are described in the 6 Nair, Nair et al., and Putnam et al. patents cited above in this section.

It can be desired to have one or more amphiphilic block copolymers disposed at the interface of the one or more discrete pores and the continuous polymeric phase, as described for example in U.S. Pat. No. 9,029,431 (Nair et al.), the disclosure of which is incorporated herein by reference.

The average size of the discrete pores in the (a) porous particles is described above.

The (a) porous particles are generally present in the foamable aqueous composition in an amount of at least 0.05 weight % or of at least 0.5 weight %, and up to and including 15 weight % or up to and including 20 weight %, based on the total weight of the foamable aqueous opacifying composition (including all solvents that are present).

Optimal ii) embossed and densified foamed opacifying layers obtained according to the present invention comprise: (a) porous particles containing a small amount of an (e) opacifying colorant as described below to enhance the light blocking capacity of the (a) porous particles (particularly transmitted light blocking capacity); a (b') matrix material derived from a (b) binder material to hold the (a) porous particles in place; and the (c) two or more additives described below, and optionally including one or more tinting colorants that can be in other (a) porous particles or dispersed within the ii) embossed and densified foamed opacifying layer. Thus, the foamed aqueous opacifying composition used to prepare the ii) embossed and densified foamed opacifying layer comprises foam cells that surround the (a) porous particles.

Upon drying the applied foamed aqueous opacifying composition, the large mismatch in refractive index between the discrete pores of the (a) porous particles and the polymer walls (in the continuous polymeric phase), and the dried foam cells, causes incident electromagnetic radiation passing through the ii) embossed and densified foamed opacifying layer to be scattered by the multiplicity of interfaces and discrete pores. When a small amount of (e) opacifying colorant is present in the (a) porous particles, the opacifying power of the ii) embossed and densified foamed opacifying layer is increased due to the multiple scattering of electromagnetic radiation, increasing the chance that the electromagnetic radiation will encounter the opacifying colorant and be blocked or absorbed by it.

A single ii) embossed and densified foamed opacifying layer is present in the patterned light-blocking elements according to the present invention, as opposed to multiple foamed white layers sandwiching a foamed black opacifying layer that are used in a multi-layer package in prior art opacifying elements. As noted, multiple light scattering effects by and among the (a) porous particles and the surrounding dry foam cells, increase the path of the electromagnetic radiation. The single ii) embossed and densified foamed opacifying layer, along with the iii) non-foamed functional composition (described below) disposed thereon, provide all of the desired advantages so that the use of additional foamed and non-foamed layers can be avoided.

(b) Binder Materials:

The foamable aqueous opacifying compositions comprises one or more (b) binder materials from which a binding (b') matrix material is derived to hold the (a) porous particles, (c) two or more additives, and (e) opacifying colorants together in an ii) embossed and densified foamed opacifying layer.

It is particularly useful that the (b) binder material have the following properties: it is water-soluble or water-dispersible; it is capable of forming a stable foamed aqueous opacifying composition with all layer comments described herein; it is capable of being disposed onto a i) fabric as described below; it does not inhibit the aeration (foaming) process (described below); it is capable of being dried and where desired also crosslinked (or cured); it has good light and heat stability and it contributes to the flexibility of the patterned light-blocking element of this invention.

The choice of (b) binder material can also be used to increase the cleanability of the resulting ii) embossed and densified foamed opacifying layers. The (b) binder material can be used to provide the (b') matrix material that adds to a supple feel to touch and flexibility especially when disposed on the back side of the i) fabric described below.

The (b) binder material can include one or more organic polymers that are film forming and can be provided as an emulsion, dispersion, or an aqueous solution, and that provide the properties noted above. It can also include polymers that are self-crosslinking or self-curable, or one or more polymers to which crosslinking agents are added and are thus curable or capable of being crosslinked (or cured) under appropriate conditions such as activation chemically with heat, radiation, or other known means. A curing or crosslinking process serves to provide improved insolubility of the resulting ii) embossed and densified foamed opacifying layer and well as desired cohesive strength and adhesion to the i) fabric. Known curing or crosslinking agents have functional groups capable of reacting with reactive sites in a (b) binder material (such as a functionalized latex polymer) under curing conditions to thereby produce a crosslinked structure.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene polymers, styrene-acrylic copolymers, vinyl polymers, vinyl-acrylic polymers, styrene-butadiene copolymers, acrylonitrile copolymers, polyesters, silicone polymers, or a combination of two or more of these organic polymers. Such (b) binder materials are readily available from various commercial sources or can be prepared using known starting materials and synthetic conditions, and can be anionic, cationic or nonionic in net charge. A useful class of film-forming (b) binder materials includes aqueous latex polymer dispersions such as acrylic latexes (including acrylic copolymers) that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, poly(vinyl chloride)-acrylic copolymers, and latexes formed from N-methylol acrylamide, butyl acrylate, and ethyl acrylate.

Each (b) binder material (or combination thereof) generally has a glass transition temperature that is less than 25° C., more likely equal to or less than −10° C., or even equal to or less than −25° C. Glass transition temperature for these materials can be determined using Differential Scanning Calorimetry.

The one or more (b) binder materials can be present in the foamable aqueous opacifying composition in an amount of at least 15 weight % or of at least 20 weight % or of at least 30 weight %, and up to and including 50 weight % or up to and including 70 weight %, based on the total foamable aqueous opacifying composition (including the weight of all solvents).

(c) Additives:

The foamable aqueous opacifying compositions can include at least 0.0001 or at least 0.001 weight % or even at least 0.01 weight %, and up to and including 2 weight % or up to and including 5 weight % or up to and including 20 weight %, or even up to and including 30 weight % of (c) two or more additives comprising at least one foaming agent (or foaming surfactant) and at least one foam stabilizing agent as defined below. These amounts refer to the total of all the (c) two or more additives in each foamable aqueous composition and are based on the total weight of those compositions (including all solvents).

Any of these (c) two or more additives, unless otherwise noted, can be obtained from various commercial sources. They can be present within any location of the foamed aqueous opacifying composition, including but not limited to the continuous polymeric phase, within discrete pores, or both within discrete pores and the continuous polymeric phase of the (a) porous particles. Alternatively, the (c) two or more additives can be present within the (b) binder material alone, or within both the (b) binder material and the (a) porous particles.

In all embodiments, the (c) two or more additives useful in the present invention are not the same compounds and do not have the same function as the (a) porous particles, (b) binder materials, and (e) opacifying colorants as described herein.

Useful (c) two or more additives include but are not limited to plasticizers, inorganic or organic pigments and dyes (for example, pigment or dye colorants different from the opacifying colorants described below), fire retardants, biocides (including fungicides and antimicrobial agents), pH buffers, optical brighteners, tinting colorants, thickeners, various surfactants, and inert inorganic or organic fillers (such as clays).

The "inert" inorganic or organic fillers are particles that can be added to reduce the use of more expensive (b) binder materials. Such fillers do not undergo a chemical reaction in the presence of water or other components in the foamable aqueous composition; nor do they absorb significant electromagnetic radiation like the (e) opacifying colorants.

At least one of the (c) two or more additives is one or more foaming surfactants each of which functions to create and enhance foam formation. In addition, the (c) two or more additives comprise one or more foam stabilizers (or foam stabilizing agents) that are also surface-active agents that function to structure and stabilize the foam once it is formed.

Representative examples of useful foaming surfactants include but are not limited to: alkyl betaines, amine oxides (amphoteric), lauryl sulfate salts, cetyl sulfate salts, sulfosuccinate ester salts, ammonium sulfosuccinate, disodium stearyl sulfosuccinate, diammonium n-octadecyl sulfosuccinamate, sulfosuccinamides, ethoxylated alcohols, ionic, nonionic or anionic agents such as fatty acid soaps or a fatty acid condensation product with an alkylene oxide (for example, the condensation product of ethylene oxide with lauryl or oleic acid or an ester of fatty alcohols), the ammonium salt of a C12 to C15 alkanol sulfate containing ethyleneoxide, ammonium ethoxy sulfate, ammonium polyethyleneoxy sulfate, alkyl phenols with 8 to 12 carbons in the alcohol group and 12 to 20 ethyleneoxy units, ammonium decylphenoxy poly(ethyleneoxy) sulfate, C11 to C15 linear secondary alcohols with 12 to 20 ethyleneoxy units, ethylene oxide adducts of linear primary alcohols with 10 to 16 carbons in the alcohol moiety, ammonium salt of a C11 to C15 secondary alkanol sulfate containing ethyleneoxide, calcium 2,4-didodecylphenoxy-poly(ethyleneoxy) sulfate, sodium salt of 2-ethyl-2-methyl-4-undecanol sulfate, ammonium dinonylphenoxy-poly(ethyleneoxy) sulfate, sodium salt of 2-ethyl-hexanol sulfate, ethylamine salt of pentadecyl-poly(ethyleneoxy)sulfate, butyl-amine salt of dodecyl-polyoxyethylene sulfate, ethoxyamine salt of octyl-polyoxyethylene sulfate, hexylamine salt of nonylphenoxy-polyethyleneoxysulfate, the corresponding alkali metal, ammonium and amine salts, fatty acid alkanolamides, tertiary alkylamines quarternized with benzene sulfonic acid, amphoteric glycine derivatives, and similar materials.

Useful foam stabilizers include but are not limited to: ammonium stearate, potassium stearate, ammonium oleate, and ammonium ricinoleate.

Useful examples of the above-mentioned foaming surfactants and foam stabilizers can be obtained from various commercial sources. Mixtures of foaming surfactants and mixtures of foam stabilizers can be used.

The relative amounts of each of these two types of (c) two or more additives is not critical if the desired function is evident, that is suitable foaming properties as required to prepare the foamed aqueous opacifying composition, and stability of the foamed aqueous opacifying composition during storage and manufacture of the patterned light-blocking elements.

Useful biocides (microbial or antifungal agents) that can be present as some of the (c) two or more additives include but are not limited to: sulfosuccinamides; silver metal (in any form); silver-containing compounds such as silver chelates and silver inorganic or organic salts; copper metal (in any form); and copper-containing compounds such as copper chelates and copper salts.

It can also be useful to include thickeners as some of the (c) two or more additives to modify the viscosity of the foamable aqueous opacifying composition. A skilled worker can optimize the viscosity to obtain optimal aeration conditions and desired foam density as described below.

Useful (c) two or more additives can also comprise one or more tinting colorants that can be suitable dyes or pigments (or combinations) and can be used to provide a specific observable color, coloration, or hue in the resulting patterned light-blocking elements. These materials are not chosen to provide the opacifying property described below for the (e) opacifying colorants and thus, tinting colorants are intended to be different materials than the (e) opacifying colorants. The one or more tinting colorants can be incorporated within the (a) porous particles (either within the volume of discrete pores, within the continuous polymeric phase, or in both places), or they can be uniformly dispersed within the (b) binder material, and they can be in the same or different location as the (e) opacifying colorant(s).

The one or more tinting colorants can be present in the foamable aqueous composition in an amount of at least 0.0001 weight % and up to and including 3 weight %, based on the total weight of the foamable aqueous opacifying composition (including all solvents). For example, the (c) two additives can comprise six or more materials that include for example, at least one foaming surfactant, at least one foam stabilizer, at least one thickener, at least one tinting colorant, at least one flame retardant, and at least one biocide.

Further, when desired, other useful additives include fire retardant materials such as antimony trioxide and decabromodiphenyl ethane.

(d) Aqueous Medium:

Water is the primary solvent used in an (d) aqueous medium in the foamable aqueous opacifying compositions, meaning that water comprises at least 75 weight % or more likely at least 80 weight % and up to and including 100 weight % of the total solvent weight. Auxiliary solvents (such as alcohols and ketones) that can be present must not adversely affect or harm the other components in the composition. Nor must such auxiliary solvents adversely affect formation of the foamable aqueous opacifying composition or its use to prepare a patterned light-blocking element.

The (d) aqueous medium then, which is primarily water, comprises at least 30 weight % or at least 40 weight %, and up to and including 60 weight % or up to and including 65 weight %, of the total weight of the foamable aqueous opacifying composition.

(e) Opacifying Colorants:

The (e) opacifying colorants used in the present invention can be a single material or a suitable combination of materials such that the single or multiple materials absorb UV and visible electromagnetic radiation (defined above) to provide blackout properties and to facilitate light-blocking. The (e) opacifying colorants can be soluble dyes or pigments or combinations thereof. The (e) opacifying colorants are different compositional and functionally from the compounds defined above as the (c) two or more additives.

In most embodiments, the one or more (e) opacifying colorants are present within the (a) porous particles, for example in a volume of at least some (or all) of the discrete pores within the (a) porous particles; within the continuous polymeric binder of the (a) porous particles; or within both the volume of at least some (or all) of the discrete pores and the continuous polymeric binder of the (a) porous particles. The (a) porous particles can be used to "encapsulate" various (e) opacifying colorants as well as tinting colorants or other materials of the (c) two or more additives so they are kept isolated from the other components of the foamable aqueous opacifying composition in the patterned light-blocking element. However, in some embodiments, it can be useful to incorporate (e) opacifying colorants solely or additionally within the (b) binder material.

While the (e) opacifying colorant(s) are not purposely chosen in type or amount for coloration and are materials that are chosen to be different from the tinting colorants described above.

Representative examples of (e) opacifying colorants that can be used individually or in combination include but are not limited to, visually neutral (that is, no color as observed using the unaided human eye) or black pigments or dyes, a carbon black, black iron oxide, graphite, aniline black, anthraquinone black, and combinations of colored pigments or dyes such as combinations of two or more cyan, magenta, green, orange, blue, red, and violet dyes. Such opacifying colorants or combinations thereof are characterized by a complete absence of hue and chroma and as such they appear black or visually neutral in color to the unaided human eye. A carbon black, a neutral or black pigment or dye (or combination thereof), or a combination of pigments or dyes other than carbon black, is particularly useful as an opacifying colorant. Combinations of dyes or pigments such as a combination of the subtractive primary-colored pigments (cyan, magenta, and yellow colored pigments) can also be used to provide a visually neutral (e) opacifying colorant.

The (e) opacifying colorant(s) can be generally present in the foamable aqueous opacifying composition in an amount of at least 0.001 weight % or of at least 0.003 weight %, and up to and including 0.2 weight % or up to and including 0.5 weight %, all based on the total weight of the foamable aqueous opacifying composition (including all solvents).

In some embodiments, the (e) opacifying colorant is a carbon black that is present in an amount of at least 0.003 weight % and up to and including 0.2 weight %, based on the total weight of the foamable aqueous opacifying composition.

Encapsulated of a (e) opacifying colorant within the volume of the discrete pores of the (a) porous particles may require milling as describe in the cited Nair, Nair et al., and Putnam et al. patents cited above.

Alternatively, the (e) opacifying colorant can be incorporated within the continuous polymeric phase of the (a) porous particles by incorporating the (e) opacifying colorant in the oil phase used in making the (a) porous particles.

Foamed Aqueous Opacifying Compositions

Foamed aqueous opacifying compositions can be prepared using the procedures described below wherein an inert gas (such as air) is mechanically incorporated into the foamable aqueous composition as described above, which procedures are designed to provide a foam density of at least $0.1$ g/cm$^2$ and up to and including $0.5$ g/cm$^3$, or more likely of at least $0.15$ g/cm$^3$ and up to and including $0.4$ g/cm$^3$. Foam density can be determined gravimetrically by weighing a known volume of the foamed aqueous opacifying composition.

The resulting foamed aqueous opacifying composition according to this invention generally has at least 35% solids or at least 40%, and up to and including 60% or up to and including 70%, solids.

Components (a) through (e) of the foamed aqueous opacifying composition are generally present in the same relative amounts as described for the foamable aqueous opacifying composition (described above) as the foaming process does not appreciably add to or diminish the relative amounts of such components.

For example, the (a) porous particles (as described above) can be present in the foamed aqueous opacifying composition in an amount of at least 0.05 weight % or of at least 0.5 weight %, and up to and including 10 weight % or up to and including 15 weight %, based on the total weight of the foamed aqueous opacifying composition (including all solvents).

One or more (b) binder materials (as described above) can be present in an amount of at least 15 weight % or of at least 20 weight % or even of at least 30 weight %, and up to and including 50 weight % or up to and including 70 weight %, based on the total weight of the foamed aqueous opacifying composition (including all solvents).

The (c) two or more additives (as described above) can be present in an amount of at least 0.0001 weight % or up to and including 0.001 weight % or even of at least 0.1 weight %, and up to and including 20 weight % or up to and including 30 weight %, based on the total weight of the foamed aqueous opacifying composition (including all solvents). At least one of the (c) two or more additives must be a foamed surfactant as described above, and another of the (c) two or more additives must be a foam stabilizer as described above. Tinting colorants can also be present as noted above.

Water can also be present as the predominant solvent (at least 75 weight % of total solvent weight), and all the solvents in an (d) aqueous medium can be present in an amount of at least 30 weight % or of at least 40 weight %, and up to and including 60 weight % or up to and including 70 weight %, based on the total weight of the foamed aqueous opacifying composition.

The (e) opacifying colorants (as described above) are generally present in any suitable amount to provide the desired appearance, coloration, and opacity in the resulting patterned light-blocking element, In many embodiments, the one or more (e) opacifying colorants can be present in an amount of at least 0.001 weight % or of at least 0.001 weight % or even of at least 0.003 weight %, and up to and including 0.5 weight % or up to and including 0.2 weight %, all weights based on the total weight of the foamed aqueous opacifying composition (including all solvents).

For example, an opacifying colorant can be a carbon black and present in an amount of at least 0.003 weight % and up to and including 0.2 weight % based on the total weight of the foamed aqueous opacifying composition.

Patterned, Light-Blocking Elements

Patterned light-blocking elements according to the present invention can be prepared using inventive Methods I, II, and III described below. Such articles consist essentially of a i) fabric (described below), a single ii) embossed and densified foamed opacifying layer formed on back side of the i) fabric in a manner described below, and a iii) non-foamed functional composition (sometimes transparent to visible electromagnetic radiation) disposed over (or in most embodiments, directly on) the single ii) embossed and densified foamed opacifying layer, as described below. Only these features are required to achieve the desired advantages in the patterned light-blocking elements of this invention, including simplified manufacture in industry and use by consumers.

Each i) fabric useful herein generally has two opposing sides, for example, a face side and an opposing back side and can be composed of materials described below. In some embodiments, for example as described for inventive Method I below and for patterned light-blocking elements obtained therefrom, the i) fabric has a prefabricated visible relief pattern on at least a portion of its face side, but no visible relief pattern on the back side. This prefabricated visible relief pattern has raised regions and recessed regions, generally in a designed pattern. By "prefabricated", it is meant that the visible relief pattern has been provided on at least a portion of the face side prior to forming the ii) embossed and densified foamed opacifying layer on the back side of the i) fabric, for example, perhaps in a textile fabricating factory or by a preparatory operation such as an embroidering operation using appropriate heavy threads, carried out prior to Method I of the present invention. For example, useful i) fabrics of this type can be embroidered fabrics or Jacquard fabrics. In some embodiments, the i) fabric has a prefabricated visible relief pattern on only a selected portion of its face side. In other embodiments, the prefabricated visible relief pattern is on the entire surface of the i) fabric face side.

In other embodiments of the present invention, for example the inventive Method II and inventive Method III for making patterned light-blocking elements, the i) fabric has both a face side and an opposing back side, but there is no prefabricated visible relief pattern on either the face side or the back side, in contrast to the i) fabric described above for inventive Method I. Such i) fabrics useful in inventive Method II or inventive Method III also can be composed of the materials described below. As described below, a visible relief pattern having raised regions and recessed regions can be provided in the ii) embossed and densified foamed opacifying layer, during a D') embossing and densifying feature of inventive Method II, or during the G") embossing feature during inventive Method III, on the back side of the i) fabric. In some embodiments, the visible relief pattern is formed in D') or G") in only a selected portion of the ii) embossed and densified foamed opacifying layer. However, in other embodiments, the visible relief pattern is formed in D') or G") on the entire ii) embossed and densified foamed opacifying layer.

For the patterned light-blocking elements of the present invention prepared according to inventive Method I, some or all of the recessed regions can comprise visible perforations going through the ii) embossed and densified foamed opacifying layer that has also been cured.

For all embodiments of the present invention, the i) fabric useful in the practice of the present invention can comprise various porous or non-porous, woven and nonwoven textile fabrics composed of nylon, polyester, cotton, aramide, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbonene, polymethyl pentene, polyether ketone, (meth)acrylonitrile], and other porous materials that would be apparent to one skilled in the art as useful for providing woven or non-woven fabric articles. Each i) fabric can have a dry thickness of at least 50 μm.

As noted above, the patterned light-blocking elements prepared according to this invention are designed with a single ii) embossed and densified foamed opacifying layer as the only foamed layer disposed directly on only the back side of the i) fabric. In such elements, the single ii) embossed and densified foamed opacifying layer and the non-foamed functional composition (or layer) disposed thereon are the only essential layers or compositions on the back side of the i) fabric in the patterned light-blocking element. This simplified structure has numerous advantages over the multilayer structures known in the art where an opacifying colorant in a foamed layer is generally sandwiched between other foamed layers, with or without a fabric substrate, each foamed layer having various pigments or particulate fillers. Moreover, such multilayer structures prohibit the type of embossing operations described for the present invention. Such undesirable multilayer articles are described for example, in U.S. Pat. No. 4,677,016 (Ferziger et al.).

The ii) embossed and densified foamed opacifying layer that has also been cured, can be derived by suitable disposing of a foamed aqueous opacifying composition described above comprising essential components (a), (b') derived from (b), (c), (d), and (e), all of which are described in more detail above, followed by suitable drying.

Component (a) porous particles can be present in an amount of at least 0.1 weight % or of at least 0.5 weight %, and up to and including 25 weight % or up to and including 35 weight %, and are described in composition, size, and other details above, the amounts based on the total weight of the ii) embossed and densified foamed opacifying layer that can be in cured form also.

In addition, the foamed opacifying layer includes a (b') matrix material that is derived from a (b) binder material upon curing, which (b') matrix material can be present in an amount of at least 10 weight % or of at least 20 weight %, and up to and including 60 weight % or up to and including 80 weight %, based on the total weight of the ii) embossed and crushed foamed opacifying layer that can be in cured form also. Such (b') matrix materials are at least partially cured or crosslinked as described below [for example, in F) of inventive Method I or in F') of inventive Method II] and can be cured up to 100% of all potential curable or crosslinking sites in the (b) binder material.

The (c) two or more additives can be present in an amount of at least 0.0001 weight % or at least 1 weight %, and up to and including 45 weight % or up to and including 50 weight %, based on the total weight of the ii) embossed and densified foamed opacifying layer that can be in cured form also. As described above, such (c) two or more additives include one or more foaming surfactants and one or more foam stabilizers, and optionally other components. In particular, the ii) embossed and densified foamed opacifying layer can comprise one or more tinting colorants as part of the (c) two or more additives, for example in an amount of at least 0.0001 weight % and up to and including 3 weight %, based on the total weight of the ii) embossed and densified foamed opacifying layer that can be in cured form also.

After "drying", the ii) embossed and densified foamed opacifying layer is substantially in dry form, containing less than 5 weight %, or even less than 2 weight %, of the d) aqueous medium (including water and any auxiliary solvents), based on the total weight of the ii) embossed and densified foamed opacifying layer. The ii) embossed and densified foamed opacifying layer generally comprises at least 95% solids or at least 98% solids.

The ii) embossed and densified foamed opacifying layer can also contain at least 0.0001 weight % or at least 0.002 weight % and up to and including 2 weight % or up to and including 3 weight %, of one or more (e) opacifying colorants (as described above), based on the total weight of the ii) embossed and densified foamed opacifying layer that can be in cured form also. For example, a carbon black can be present as the (e) opacifying colorant in an amount of at least 0.002 weight % and up to and including 1 weight %, based on the total weight of the ii) embossed and densified foamed opacifying layer that can be in cured form also, and can be present in the discrete pores of the (a) porous particles.

Non-Foamed Functional Compositions and Formulations

A non-foamed functional composition formulation is used to form a iii) non-foamed functional composition (or layer) over the ii) embossed and densified foamed opacifying layer, which has one or more functional properties described below. A non-foamed functional composition can comprise (aa) glass particles or organic polymeric particles (described below) mixed with (ad) one or more water-soluble or water-dispersible organic polymeric binders as the sole essential components.

Before application, each non-foamed functional composition formulation can comprise a stable aqueous dispersion of the essential components and any optional components described below.

A non-foamed functional composition formulation can be disposed over (for example, directly on) the densified and foamed opacifying layer in a suitable manner to provide a iii) non-foamed functional composition (or layer) that for example, covers all or a portion of the densified foamed opacifying layer disposed on the back side of the i) fabric.

For example, the non-foamed functional composition formulation can be disposed on an ii) embossed and densified foamed opacifying layer (inventive Method I and inventive Method II) or on a densified and cured foamed opacifying layer (inventive Method III) in a discontinuous or continuous manner on the back side of the i) fabric, for example by spraying using a suitable spray apparatus. Thus, the iii) non-foamed functional composition can be disposed directly in a uniformly continuous manner so that there are no intermediate materials or layers between the iii) non-foamed functional composition and the underlying foamed opacifying layer.

The non-foamed functional composition formulation is not foamed to an appreciable extent, and thus, the resulting applied iii) non-foamed functional composition is also "non-foamed", that is, it has minimal voids or foam cells in either wet or dry form, for reasons noted below. Thus, the non-foamed functional composition formulation generally has a density of at least 1, which is greater than the density of the resulting ii) embossed and densified foamed opacifying layer.

The non-foamed functional composition formulation generally has at least 1% solids and up to and including 15% solids with water being the predominant solvent (that is, more than 50 weight % and up to 100 weight % of total solvents).

The iii) non-foamed functional composition can be present in a patterned light-blocking element of the present invention at a dry coverage of at least 0.1 g/m$^2$ or of at least 1 g/m$^2$, and up to and including 20 g/m$^2$ or up to and including 50 g/m$^2$.

The iii) non-foamed functional composition can also provide one or more of the following functions. It can provide: a "release" function where the coefficient of friction between the ii) embossed and densified foamed opacifying layer and any other solid surface is reduced allowing easy separation of the contacting surfaces; an anti-blocking function where microscopic protrusions or asperities help to minimize surface adherence between the ii) embossed and densified foamed opacifying layer and any other solid surface by increasing the distance between the two contacting surfaces, thereby minimizing blocking; antimicrobial function (with one or more antimicrobial agents present); a tactile experience where the iii) non-foamed functional composition enhances the tactile experience (or "feel") of the ii) embossed and densified foamed opacifying layer; an antistatic function to reduce static charge; and a soil resistance function to reduce potential soiling.

In addition, these (aa) glass particles or organic polymeric particles are capable of resisting melt flow at pressures up to and including 100 psi (689.5 kPa) and temperatures up to and including 220° C. This component enables release of the ii) embossed and densified foamed opacifying layer from hot surfaces such as for example, a blanket belt used during dye sublimation thermal transfer printing process, and preventing unwanted blanket belt contamination by (b') matrix materials derived from (b) binder materials having a glass transition temperature of less than 25° C.

Useful (aa) glass particles or organic polymeric particles include but are not limited to finely dispersed, free-flowing powders consisting of: thin-walled hollow glass microspheres made of soda-lime-borosilicate glass; crosslinked silicone based organic polymers; a poly(alkylsilylsesquioxane); a crosslinked styrenic polymer or copolymer; a crosslinked acrylate or methacrylate polymer or copolymer; a crosslinked acrylamide or methacrylamide polymer or copolymer; a crosslinked allylic polymer or copolymer; or a combination of two or more of these materials. Such materials can be obtained from various commercial sources, or prepared using known procedures and starting materials.

It is preferable for the (aa) glass particles or organic polymeric particles to include glass particles (either completely solid, porous, or hollow in nature) that generally have an average particle size of at least 5 μm, or of at least 20 μm and up to and including 60 μm, or up to and including 100 μm. Average particle size can be determined by using known procedures and equipment to measure the largest diameter of a plurality of glass particles and determining an arithmetic average.

Useful glass particles can be made from different chemical types of glasses. This includes soda-lime borosilicate, alkali-free or fused silica, among other specialized glasses. Such materials can be obtained from various commercial sources or prepared using known procedures and starting materials. While completely solid glass particles can be used in some embodiments, it may be desirable that the glass particles are hollow glass particles having a single void volume surrounded by a shell of glass. Examples of useful commercial hollow glass particles of this nature include soda-lime-borosilicate hollow glass particles obtainable from 3M that are available as a series of products for different applications, for example, the S series, K series, iM series, XLD series, and HGS series. Of these the iM16K hollow glass particles are particularly desirable.

The useful glass particles can have a density of at least 0.1 g/cm$^3$ and up to and including 2.2 g/cm$^3$ depending upon whether they are hollow glass particles or solid glass particles.

The (aa) glass particles (such as hollow glass particles) or organic polymeric particles can be present in the iii) non-foamed functional composition in an amount of at least 10 weight % or of at least 20 weight %, and up to and including 80 weight % or up to and including 99 weight %, based on the total weight of the iii) non-foamed functional composition. The corresponding amounts of the glass (aa) particles (for example, hollow glass particles) or organic polymeric particles in the non-foamed functional composition formulation can be at least 0.25 weight % or at least 0.5 weight %, and up to and including 10 weight % and up to and including 20 weight %, all based on the total weight of the non-foamed functional composition formulation.

The (aa) glass particles or organic polymeric particles can be present in the iii) non-foamed functional composition at a dry coverage of at least 0.001 g/m$^2$ or of at least 1 g/m$^2$, and up to and including 20 g/m$^2$ or up to and including 30 g/m$^2$.

Another essential component in the iii) non-foamed functional composition is one or more (ad) water-soluble or water-dispersible organic polymeric binders. In general, each of these materials or the combination of two or more of such materials has $T_g$ below 25° C. (determined as described above using DSC) in which the (aa) glass particles or organic polymeric particles are dispersed. Each (ad) water-soluble or water-dispersible organic polymeric binder can be film-forming, that is, it can form a film once applied and dried. Such materials can be self-crosslinkable or crosslinkable using an optional (ae) crosslinking agent as described below. Useful one or more (ad) water-soluble or water-dispersible organic polymeric binders include but are not limited to, film forming polymers such as a partially hydrolyzed polyvinyl acetate, poly(vinyl alcohol), poly(vinyl pyrrolidone), cellulosic polymers (such as carboxymethyl cellulose and hydroxymethyl cellulose), a polysaccharide, a poly(ethylene oxide), acrylamide polymers, polyester ionomers, gelatin or gelatin derivatives, gellan, starches, polyethylene imine, polyvinyl amine, and derivatives of these materials, fluorinated polymers such as fluorinated polyurethanes, polymers containing siloxane moieties, polyurethanes, urethane-acrylic copolymers, other acrylic polymers derived at least in part from one or more acrylic esters or methacrylic esters, styrene-acrylic copolymers, vinyl polymers, polyesters, or a combination of two or more of same or different types of these organic polymer binders. Such one or more (ad) water-soluble or water-dispersible organic polymeric binders are readily available from various commercial sources or can be prepared using known starting materials and synthetic conditions. A useful fluorinated polyurethane is available as 3M® Stain Resistant Additive SRC-220 from 3M Company. Another useful material is a self-crosslinking copolymer derived from n-butyl acrylate, ethyl acrylate, and N-methylol acrylamide having a glass transition temperature ($T_g$) that is less than −5° C. When mixtures of such (ad) water-soluble or water-dispersible organic polymeric binders are present, at least one of them can be a fluorinated polyurethane. The one or more (ad) water-soluble or water-dispersible organic polymeric binders can be useful for adhering the (aa) glass particles or organic polymeric particles and any other components to the ii) embossed and densified foamed opacifying layer, and to provide an enhanced level of abrasion resistance and cohesiveness. Such (ad) water-soluble or water-dispersible organic polymeric binders described above are readily available from various commercial sources or prepared using known starting materials and synthetic conditions.

The one or more (ad) water-soluble or water-dispersible organic polymeric binders can be present in the non-foamed functional composition formulation in an amount of at least 0.05 weight % or of at least 0.1 weight %, and up to and including 2 weight % or up to and including 5 weight %, based on the total weight of the non-foamed functional composition formulation. The (ad) water-soluble or water-dispersible organic polymeric binder(s) can be present in the iii) non-foamed functional composition an amount of at least 1 weight % or at least 5 weight %, and up to and including 75 weight % or up to and including 90 weight %, based on the total disposed, dried, and cured iii) non-foamed functional composition weight.

In both the non-foamed functional composition formulation and the resulting disposed, dried, and cured iii) non-foamed functional composition, it desirable to have a weight ratio of (aa) glass particles or organic polymeric particles to the one or more (ad) water-soluble or water-dispersible organic polymeric binders of from 10:1 to and including 1:5, or from 10:1 to and including 1:1.

It may be beneficial to partially or wholly chemically crosslink some of the one or more (ad) water-soluble or water-dispersible organic polymeric binders that are crosslinkable to improve cohesiveness by including a (ae) crosslinking agent in cases where the binder is not self-crosslinkable. The identity and amount of a suitable (ae) crosslinking agent will depend on the choice of (ad) water-soluble or water-dispersible organic polymeric binder and its reactivity with the (ae) crosslinking agent, the number of crosslinking sites available, compatibility with other iii) non-foamed functional composition components, and manufacturing constraints such as non-foamed functional composition formulation pot life, application means, and drying speed.

Non-exclusive examples of (ae) crosslinking agents include glyoxal, CARTABOND® TSI (Clariant), CARTABOND® EPI (Clariant), SEQUAREZrm 755 (Omnova), glutaraldehyde sodium bisulfate complex (Aldrich), Sunrez 700M (Om nova), Sunrez 700C (Omnova), CR-5L (Esprix), bis (vinyl) sulfone, bis(vinyl) sulfone methyl ether, adipoyl dihydrazide, epichlorohydrin polyamide resins, and urea-formaldehyde resins, all of which are available from various commercial sources. In one embodiment, a (ad) water-soluble or water-dispersible organic polymeric binder includes a hydrolyzed polyvinyl acetate polymer that has been crosslinked using an epichlorohydrin polyamide resin compound.

Optional components in the iii) non-foamed functional composition include the following materials.

A (ab) lubricant (or mixtures thereof) can be present in non-liquid (or solid) form and generally has a crystallinity of at least 50% and melts very little at temperatures below 40° C., and a wax melt viscosity of at least 5 centipoise (5 mPa-sec) and up to and including 100 centipoise (100 mPa-sec). Solid lubricants can be nonliquid waxes, metal esters of fatty acids such as calcium soaps, graphite, silicone-based polymers, and fluoropolymers. Further details of materials useful as (ab) lubricants are provided in U.S. Patent Application Publication 2020-0216684A1 (Nair), the disclosure of which is incorporated herein by reference.

A (ab) lubricant described herein can be present in the iii) non-foamed functional composition at a dry coverage of at least 0.01 g/m$^2$ and up to and including 30 g/m$^2$.

Tinting materials also can be present in the non-foamed functional composition as one or more pigments, one or more dyes, or any combination thereof, and can be used to provide a ΔE 2000 value of at least 3.5, and more likely of at least 4 relative to a patterned light-blocking element from which the iii) non-foamed functional composition has been omitted. In some embodiments, one or more white pigments can be present to provide a "whiter" appearance, that is providing an L® value greater than 70 (or greater than 80). Useful white pigments include but are not limited to titanium dioxide, barium sulfate, calcium carbonate, and combinations of two or more of such materials. Other useful tinting materials can comprise cyan, magenta, yellow, red, green, or blue pigments, or combinations two or more thereof, that produce the desired coloration or hue. Such colored pigments can be combined with white pigments.

In all embodiments, the tinting material is not the same material as the (aa) glass particles or organic polymeric particles or the (ad) water-soluble or water-dispersible organic polymeric binder. The tinting material, however, can be the same as or different from the tinting colorants present as the (c) two or more additives in the ii) embossed and densified foamed opacifying layer.

The non-foamed functional composition formulation can also include one or more wetting surfactants that are (ag) coating aids to aid in coating or deposition. If the application of the formulation by spraying to provide a uniform iii) non-foamed functional composition (or layer) using a known coating procedure, any surface-active material ("surfactant") that will lower the surface tension of the formulation sufficiently to prevent edge-withdrawal, repellencies, and other coating defects can be used. For example, useful (ag) coating aids include but are not limited to, alkyloxy- or alkylphenoxypolyethers and polyglycidol derivatives and their sulfates, such as nonylphenoxypoly(glycidol) that are available from Olin Matheson Corporation; sodium octylphenoxypoly(ethyleneoxide) sulfate; organic sulfates and sulfonates, such as sodium dodecyl sulfate, sodium dodecyl sulfonate, sodium bis(2-ethylhexyl)sulfosuccinate (Aerosol OT); and alkyl carboxylate salts such as sodium decanoate. Certain (ag) coating aids are particularly useful if the non-foamed functional composition is sprayed onto the densified foamed opacifying layer. Such (ag) coating aids can be spreading agents that are capable of reducing the surface tension substantially to aid in the formation of small drops such as for spraying. Examples of such surfactants are nonionic organo-modified trisiloxanes like SILWET© L-77 and L-7608 and COATOSIL™ 77, and acetylenic diols such as SURFYNOL® 104 and SURFYNOL® 104, obtainable from various commercial sources. Useful (ag) coating aids (wetting surfactants) can have a hydrophilic-lipophilic balance (HLB) number of at least 5.

Useful (ag) coating aids can be present in the non-foamed functional composition formulation in an amount of at least 0.01 weight % and up to and including 5 weight %, based on the total weight of the non-foamed functional composition formulation.

The iii) non-foamed functional composition can include one or more of various additives that provide various properties or characteristics to the application thereof, such as biocidal or antimicrobial properties; antistatic properties to dissipate electrical charge and static; modification to change the tactile experience of outer surface of the patterned light-blocking element; visual modification to provide a matte, opalescent or other such desirable look; and soil resistance for reduction of the potential for soiling from handling or spills.

In some embodiments, (af) untreated synthetic silica such as fumed silica (or pyrogenic silica) and precipitated silica can be present in the iii) non-foamed functional composition to give the resulting patterned light-blocking element a whiter appearance, for example so the overall L® value of the patterned light-blocking element is at least 80. Such a material can be present in an amount of at least 0.5 weight % and up to and including 10 weight %, based on the total weight of the iii) non-foamed functional composition. More details of such materials are provided in U.S. Patent Application Publication 2022-0227956 (Nair et al.), the disclosure of which is incorporated herein by reference.

It is also optional to include a thickener, or mixtures thereof, in the non-foamed functional composition formulation. Useful thickeners are generally non-associative thickeners, such as alginates, guar gum, locust bean gum, xanthan gum, acrylic polymers that are alkali swellable, agar, carboxymethyl cellulose, pectin, or carrageenan. Such thickeners may be present in an amount of at least 0.001 weight % and up to and including 10 weight %, based on the total weight of the non-foamed functional composition formulation.

Methods of Providing Patterned Light-blocking Elements

Figure 5:
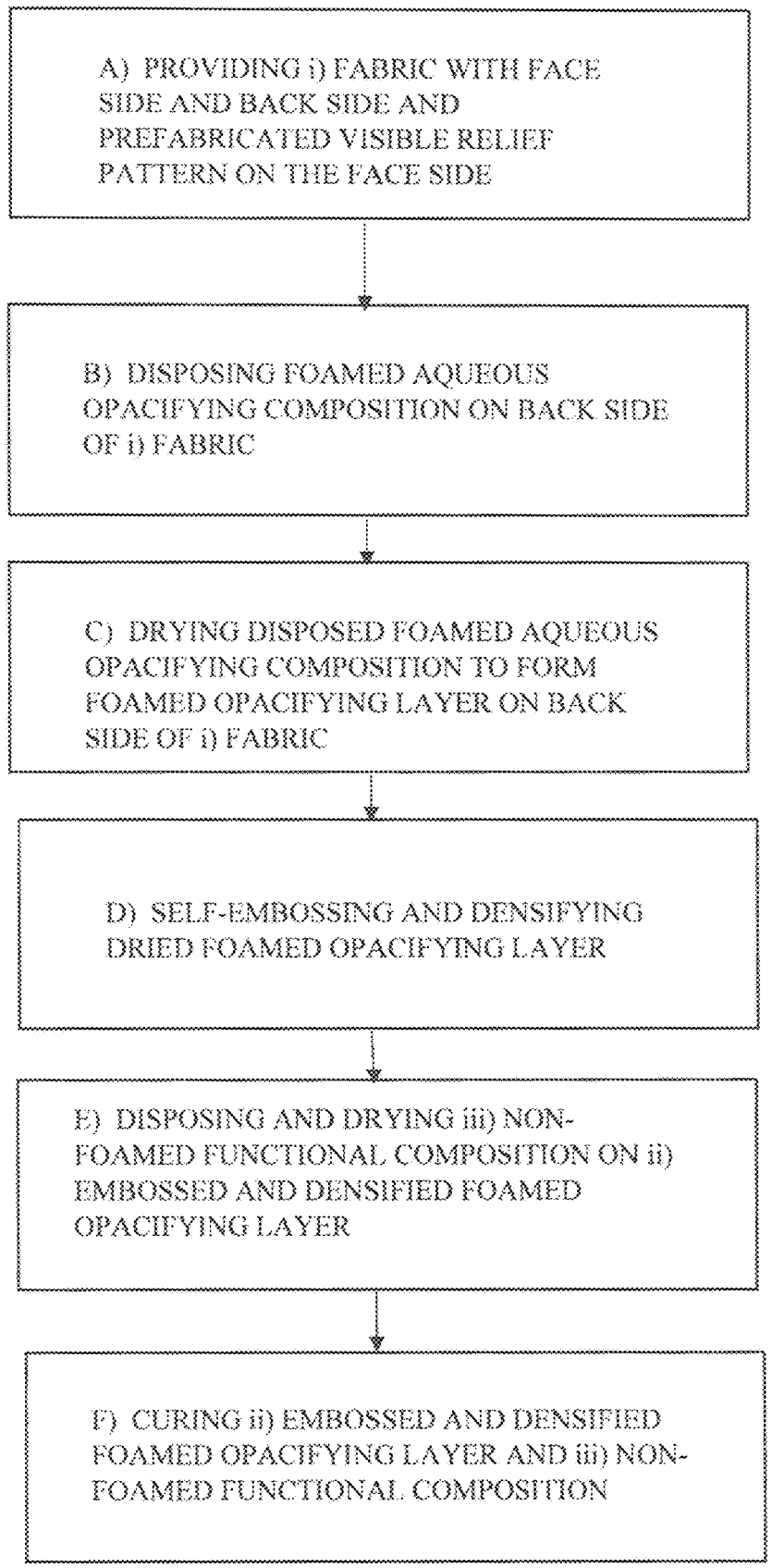
FIG. 5 is a schematic flow chart outlining the basic operations of Method I wherein features A) through F) are carried out.
Figure 6:
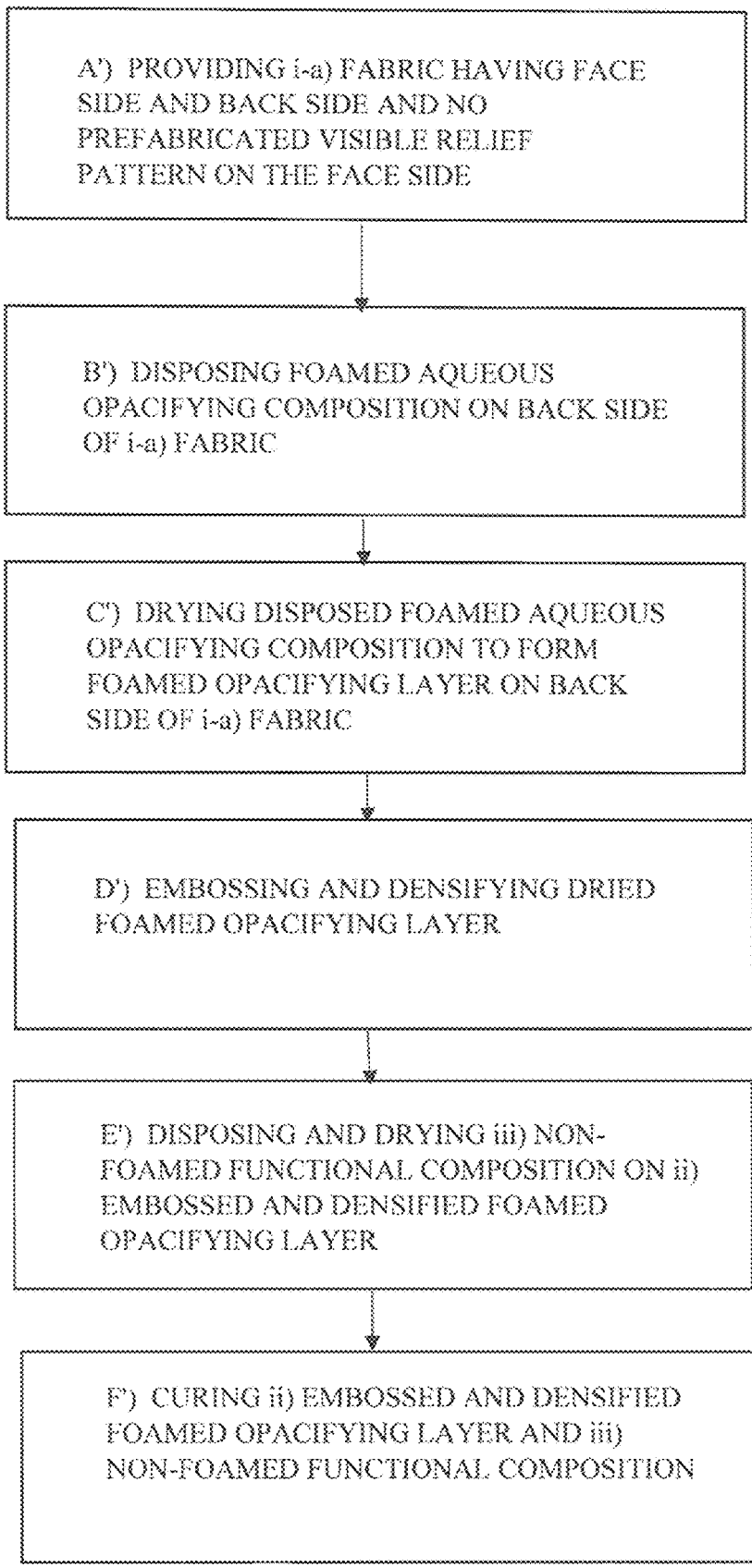
FIG. 6 is a schematic flow chart outlining the basic operations of Method II wherein features A') through F') are carried out.
Figure 7:
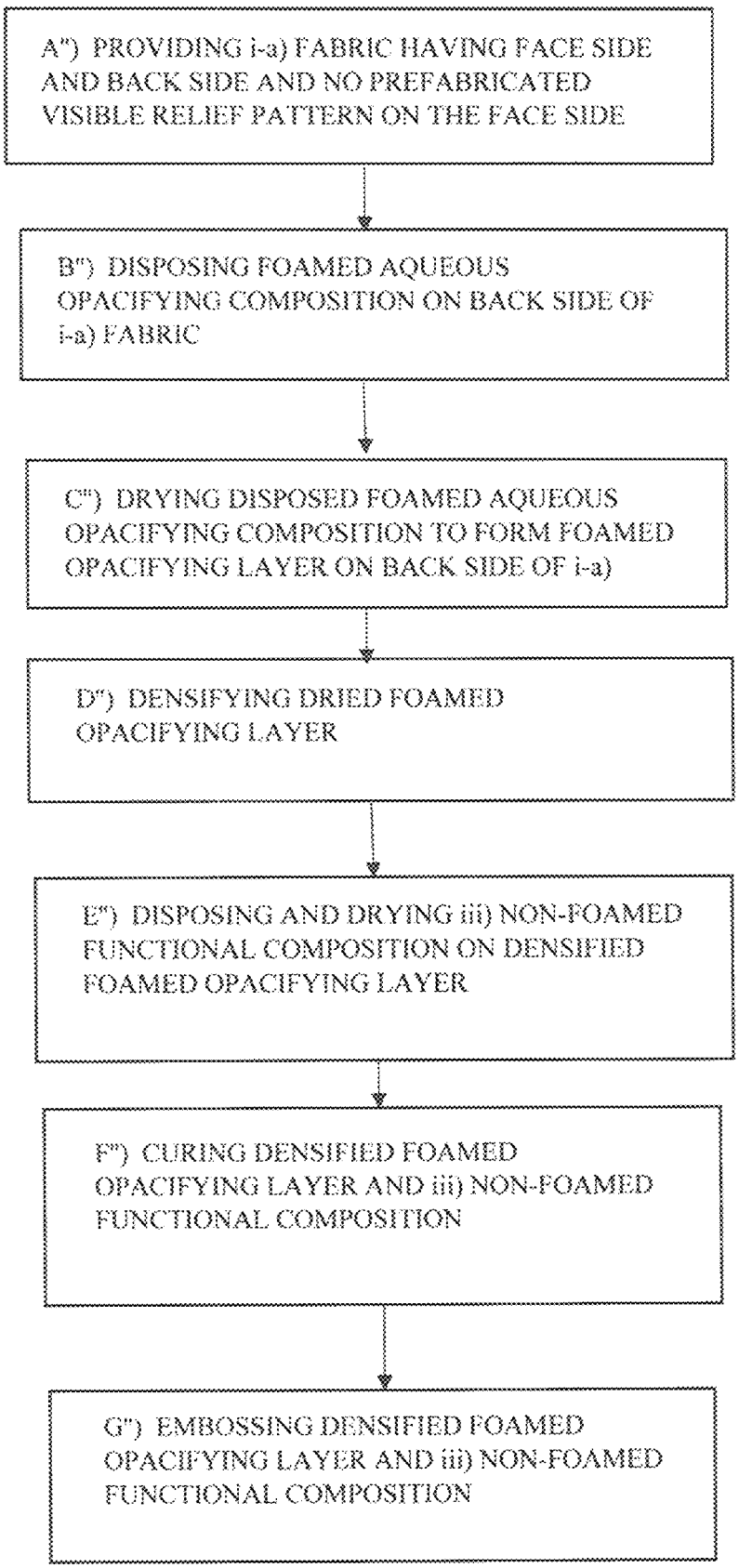
FIG. 7 is a schematic flow chart outlining the basic operations of Method III wherein features A") through G") are carried out.

The inventive patterned light-blocking elements can be prepared using any of inventive Method I, inventive Method II, or inventive Method III, each as described below. Each of the inventive Methods I, II, and III are schematically illustrated in FIGS. 5 to 7, respectively.

Method I:

This inventive method comprises features A) through F) as described below, in the noted order unless otherwise stated.

In A), a i) fabric having both a face side and a back side (as defined above), and also having a prefabricated visible relief pattern on at least a portion (or on the entirety) of the face side of the i) fabric, is provided for the following B) through F) features or operations. The prefabricated visible relief pattern on the face side has both raised regions and recessed regions. The raised regions can have any desired height about the surface of the face side of the i) fabric, and such heights are not necessarily uniform. The recessed regions can have any desired depth below that surface and such depths are not necessarily uniform. Some of the recessed regions can comprise perforations or pinholes that go through the face side to the back side of the i) fabric, but it is not necessary that every recessed region has a perforation or pinhole.

By the term "prefabricated", we mean that the i) fabric is provided with the visible relief pattern for this inventive method, in contrast to inventive Methods II and III below where a i) fabric is used having no prefabricated visible relief pattern on either surface. Moreover, the term "visible" means that the relief pattern can be seen or felt by sight or touch in the face side of the i) fabric. By "relief pattern", we mean that there are raised regions and recessed regions as described above in a designed arrangement.

In some embodiments of inventive Method I, the i) fabric has the prefabricated visible relief pattern on only a selected portion of the face side, for example, along one or more edges to provide one or more logos, identifiers, text, or anti-counterfeiting images. Such prefabricated visible relief patterns can be present in a single instance, or they can be repeated several times on the face side of the i) fabric. In addition, they can be combined with other but different prefabricated visible relief patterns.

In other embodiments of inventive Method I, the i) fabric, has a prefabricated relief pattern that is present on the entire surface of the i) fabric face side such as may be used for a curtain, shade, or other window treatment, or wall or ceiling covering, so that the resulting backlit image is visible over the entire patterned light-blocking element.

Materials for useful i) fabric materials for feature A) are described above and are often provided from a suitable vendor or textile mill that incorporates a desired visible relief pattern in the fabric material. For example, such i) fabric can be a Jacquard fabric (having a woven relief pattern) or a heavily embroidered fabric (decorated with relief pattern) that is manufactured using known materials and procedures.

In feature B), a foamed aqueous opacifying composition as described above consisting essentially of components (a), (b), (c), (d), and (e) in the described amounts and having at least 35% solids and up to and including 70% solids, is disposed in a suitable manner onto the back side of the noted i) fabric having the prefabricated visible relief pattern on its face side. This foamed aqueous opacifying composition can be prepared from a corresponding foamable aqueous opacifying composition as described above using suitable aeration, to have a foam density of at least 0.1 g/cm$^3$ or of at least 0.15 g/cm$^3$, and up to and including 0.27 g/cm$^3$ or up to and including 0.4 g/cm$^3$ or even up to and including 0.5 g/cm$^3$. This aeration procedure can be carried out using suitable conditions and equipment that would be readily apparent to one skilled in the art in order to create a "foam," for example in the presence of a foaming agent that is present as at least one of the (c) two or more additives described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hansa mixer, by introducing air under pressure or by drawing atmospheric air into the foamable aqueous opacifying composition with the whipping action of the mixer. Stability of the foamed aqueous opacifying composition can be enhanced by the presence of a foam stabilizing agent as another of the (c) two or more additives described above.

The B) disposing can be carried out in any suitable manner that does not undesirably diminish the foam density (or foam structure) of the foamed aqueous opacifying composition. For example, the B) disposing can be carried out using coating equipment and coating procedures including but not limited to, blade coating, gap coating such as "knife-over-roll" and "knife over table" operation, floating knife, slot die coating, and slide hopper coating. Useful disposing or layer-forming means are described, for example, in U.S. Pat. No. 4,677,016 (noted above), the disclosure of which is incorporated herein by reference.

In many embodiments, the foamed aqueous opacifying composition can be disposed directly onto the back side of the i) fabric so there are no intervening or intermediate layers.

The amount of disposed foamed aqueous opacifying composition should be sufficient to provide an eventual dry coverage after the C) drying, of less than or equal to 10 ounces (mass)/yard$^2$ (or less than or equal to 339.08 g/m$^2$), or a dry coverage of at least 1.5 ounces (mass)/yard$^2$ (or 50.86 g/m$^2$) and up to and including 7 ounces (mass)/yard$^2$ (237.35 g/m$^2$).

After the B) disposing, the disposed foamed aqueous opacifying composition is subjected to a C) drying operation to provide a dried foamed opacifying layer on the back side of the i) fabric. There may be some partial curing of the (b) binder material at this point to form corresponding (b') matrix material. The C) drying can be accomplished by any suitable means including heating with warm or hot air, or subjecting to microwaves or IR irradiation at a temperature and time sufficient for drying, for example, at less than 130° C. No other foamed layers of any type and for any purpose are formed on the back side of the i) fabric. Thus, there is a single dried foamed opacifying layer on the back side of the i) fabric.

After the C) drying, the single dried foamed opacifying layer on the back side of the i) fabric is embossed and densified (or "crushed") in one D) operation to increase the density of the foam cells therein, thus forming an ii) embossed and densified foamed opacifying layer. This D) (self-)embossing and densifying operation includes passing the dried foamed opacifying layer while it is in intimate contact (on the back side) with the i) fabric between a pair of pressure rollers wherein the prefabricated visible relief pattern of the face side embosses the foamed opacifying layer on the back side, and provides an ii) embossed and densified foamed opacifying layer on the back side of the i) fabric. The mechanical pressure of the pair of pressure rollers densifies the foam cells in the dried foamed opacifying layer.

The original thickness of the dried foamed opacifying layer can be reduced by at least 20% of its original thickness. The thickness of the layer both before and after the D) embossing and densifying operation can be determined by a known technique such as laser profilometry. The D) embossing and densifying operation can be carried out using the pair of pressure rollers at any suitable temperature including room temperature (for example, 20° C.) and up to and including 90° C., or more likely at a temperature of at least 20° C. and up to and including 50° C. A useful D) embossing and densifying pressure can be determined using routine experimentation depending upon several factors including the composition and foam density of the foamed aqueous opacifying composition, the type and thickness of i) fabric being used, and the extent and type of the prefabricated visible raised pattern. For example, a useful pressure during densification between the pair of pressure rollers can be at least 3.5 kN/m (or about 20 lbf/linear inch) and up to and including 70 kN/m (or about 400 lbf/linear inch).

It is to be noted that in the D) embossing and densifying operation, there is no active "embossing" of the i) fabric with an embossing pressure roller or other embossing means. Neither of the pair of pressure rollers is an embossing roller as described for inventive Methods II and III below because the i) fabric already comprises a prefabricated visible relief pattern. In this context, "embossing" refers to self-embossing wherein the prefabricated visible relief pattern of the face side embosses the foamed opacifying layer on the back side during densification between the pressure rollers, forming a visible relief pattern in the resulting ii) embossed and densified foamed opacifying layer on the back side of the i) fabric. Thus, when the i) fabric with dried foamed opacifying layer on the back side is crushed between the pair of pressure rollers, a visible relief pattern is created with both raised regions and recessed regions in the resulting ii) embossed and densified foamed opacifying layer on the back side of the i) fabric, reminiscent of the prefabricated visible relief pattern of the i) fabric face side.

After the D) embossing and densifying operation, the following E) disposing and drying operation of the non-foamed functional composition and the F) curing operation can be carried out in alphabetical order [E) before F)] or in reverse order [F) before E)].

No matter the order of E) and F) in inventive Method I, during E), a suitable non-foamed functional composition formulation as described above is disposed on the ii) embossed and densified foamed opacifying layer (that is, on the i) fabric back side), and dried, to provide a iii) non-foamed functional composition. In many embodiments, the E) disposing and drying operation can be carried out immediately after the D) embossing and densifying without intermediate steps. The amount of disposed, dried, and cured iii) non-foamed functional composition is at least 0.5 g/m$^2$ or at least 2 g/m$^2$, and up to and including 8 g/m$^2$ or up to and including 10 g/m$^2$.

Disposing the non-foamed functional composition formulation can be carried out using any number of application techniques such as uniformly or non-uniformly spraying, wrapped wire rod coating, rotary screen coating, air knife coating, screen printing, gravure coating or flexographic printing (or other offset coating techniques), reversed roll coating, slot coating, gap coating, blade coating, extrusion hopper coating, roll coating, slide coating, curtain coating, pad coating, and any other technique that would be readily apparent to one skilled in the art. Moreover, disposing the non-foamed functional composition formulation can be carried out using an engraved flexible or non-flexible roller in an "anilox coating system".

It can be desirable to dispose the non-foamed functional composition formulation in a non-contact manner by using any suitable spray apparatus and system, especially when the non-foamed functional composition formulation comprises one or more (ag) coating aids described above. There are several known methods for spraying fluids that can be used in the practice of this invention. These include compressed air spraying that converts the drops of the non-foamed functional composition formulation into a mist; electrostatic spray systems where application of electric field at the nozzle controls the drop size and the electric field between the drop of non-foamed functional composition formulation and the surface controls its deposition; ultrasonic spray systems where the ultrasonic energy can be used to create a mist of uniform drop size of the functional composition formulation; and rotary spray that uses centrifugal force to atomize the non-foamed functional composition formulation. The most common spray technology uses fluid pressure and nozzle design to create non-foamed functional composition formulation drops of a desired size. In addition to controlling drop size, nozzle designs also include the geometry of an ensemble of drops exiting the nozzle. Such geometries include for example, a cone, a fan (trapezoidal), or a jet. The choice of the geometry is selected based on the application method and, depends upon the orientation between the spray nozzle and the ii) embossed and densified foamed opacifying layer and whether the spray system is mobile and the surface is stationary or vice versa or a combination of the two. In all of these methods, foaming is minimized and not intentionally done because foam in the iii) non-foamed functional compositions can lead to surface defects during deposition, or impact the quality, appearance, and functionality of the applied iii) non-foamed functional composition.

A desirable method of E) disposing and drying is to use a stationary spray system with a moving surface followed by drying. In this instance, the desired geometry of the ensemble of non-foamed functional composition formulation drops exiting a nozzle is a that of a fan with the ii) embossed and densified foamed opacifying layer on the i) fabric moving perpendicular to the plane of the fan. When the surface width is larger than the width of the fan, multiple nozzles can be employed and spaced apart such that the overlapping spray from adjacent nozzles creates a uniform coverage of drops across the width of the surface. In addition to using hydraulic pressure to disperse the drops, other mechanical forces such as nozzle pulsation, ultrasound, centrifugal force, or air currents, or a combination of two or three of these means, can be used to aid uniform distribution of the non-foamed functional composition formulation onto the intended surface. Another aspect of controlling the uniformity of the non-foamed functional composition is to control its properties, specifically its viscosity and surface tension. For achieving desirable small drops, the viscosity and surface tension at the shear rates experienced at the nozzle should be as low as possible. Shearing thinning fluids are preferred such that the viscosity at the nozzle shear rates is as low as possible. In such embodiments, the non-foamed functional composition formulation comprises a suitable (ag) coating aid (wetting surfactant) noted above, that can lower the dynamic surface tension. Useful (ag) coating aids for this purpose include those based on silicones such as for example, organo-modified trisiloxanes.

The disposed non-foamed functional composition can be dried on the ii) embossed and densified foamed opacifying layer by simple evaporation of water and any other solvents, to have the desired dry coverage. This drying can be accelerated by convection heating including forced air or infrared heating, or other means that would be apparent to one skilled in the art.

In the F) curing operation that can either precede or follow the E) disposing and drying operation, the ii) embossed and densified foamed opacifying layer and in some embodiments, the disposed and dried foamed opacifying layer, and iii) non-foamed functional composition are cured to provide a patterned light-blocking element according to the present invention.

The extent of the F) curing needed to convert most or all of the (b) binder material to the (b') binder matrix, can be determined by routine experimentation by a skilled artisan using the teaching provided herein. For example, when the F) curing follows the E) forming operation, the F) curing can be carried out under suitable conditions known to one skilled in the art to crosslink most or all of the (iv) water-soluble or water-dispersible organic polymer binders in the iii) non-foamed functional composition and to convert the (b) binder polymer(s) to the (b') matrix binder. This F) curing can be accomplished using heat or infrared radiation or other conditions that would be understood by one skilled in the art, for example, at temperatures of from 100° C. to 160° C.

Further details of coating, drying, and curing techniques that may be useful in the present invention are described in Research Disclosure No. 308119, December 1989, pages 1007-1008 and in references cited therein.

The resulting patterned light-blocking elements of the present invention formed by this inventive Method I can exhibit an optical density greater than 4 or even greater than 5, in the regions outside of the recessed regions of the visible relief pattern in the ii) embossed and densified foamed opacifying layer.

Method II:

This inventive method comprises, features (A') through (F'), in order unless otherwise indicated.

A primary difference in inventive Method II from inventive Method I is that in operation A'), the provided i) fabric having a face side and an opposing back side, does not comprise a prefabricated visible relief pattern on either its face side or its back side. Rather, a visible relief pattern is provided during the course of carrying out inventive Method II. Representative materials for the i) fabric are described above.

With the i) fabric present, one can then carry out B') disposing of a foamed aqueous opacifying composition onto the back side of the i) fabric, in a manner like operation B) of inventive Method I described above.

The disposed foamed aqueous opacifying composition is then subject to a C') drying operation to a provide a dried foamed opacifying layer on the back side of the i) fabric, using conditions and procedures described above for operation C) of inventive Method I. The dried foamed opacifying layer generally has a dry coverage of less than or equal to 10 ounces (mass)/yard$^2$, or less than or equal to 339.08 g/m$^2$ (or about 340 g/m$^2$).

Once these operations are completed, the dried foamed opacifying layer is subjected to D') embossing and densifying to reduce the thickness of the dried foamed opacifying layer by at least 20% compared to its original thickness using suitable temperature and pressure conditions as described above for the D) embossing and densifying operation of inventive Method I. This D') embossing and densifying operation can be carried out while the i) fabric with the dried foamed opacifying layer is crushed between a pair of pressure rollers. During this densification operation, embossing is also carried out using an embossing means situated between the pressure roller that is in intimate contact with the face side of the i) fabric. Thus, in inventive Method II, embossing is not carried out using "self-embossing" as described above for inventive Method I. The embossing means can be an embossing pressure roller that also serves as one of the pressure rollers, which is in contact with the face side of the i) fabric. Alternatively, the embossing means can be an embossing sleeve wrapped around or slipped onto a pressure roller and thus situated between the pair of pressure rollers and in contact with the face side of the i) fabric. Still again, the embossing means can be a continuous patterned embossing belt or web that is situated between the pair of pressure rollers and is in intimate contact with the face side of the i) fabric. In other still embodiments, the embossing means can be a sheet of a suitable fabric that has a prefabricated visible relief pattern, and this prefabricated visible relief pattern is situated between the pair of pressure rollers and is in intimate contact with the face side of the i) fabric. Thus, in each embodiment, the embossing means has a prefabricated visible relief pattern arranged on the surface that is in intimate contact with the face side of the i) fabric.

The result of this D') embossing and densifying operation is to provide an ii) embossed and densified foamed opacifying layer having a visible relief pattern of raised regions and recessed regions thereon, which ii) embossed and densified foamed opacifying layer is disposed on back side of the i) fabric. The raised regions can have any desired height above the surface of the ii) embossed and densified foamed opacifying layer, and such heights are not necessarily uniform. The recessed regions can have any desired depth below that surface and such depths are not necessarily uniform. Some of the recessed regions can comprise perforations or pinholes that go through the back side to the back side of the i) fabric, but it is not necessary that every recessed region has a perforation or pinhole.

Thus, when the i) fabric coated with the dried foamed opacifying layer on the back side is passed between the pair of pressure rollers in the presence of a chosen embossing means, a visible relief pattern is created with both raised regions and recessed regions in the resulting ii) embossed and densified foamed opacifying layer on the back side of the i) fabric. The embossing pressure roller, embossing sleeve, sheet of embossing fabric, or continuous patterned embossing belt or web is situated so that a prefabricated visible relief pattern on one surface thereof is in intimate contact with the face side of the i) fabric resulting in a similar pattern on the densified foamed opacifying layer that is disposed on the back side of i) fabric. This prefabricated visible relief pattern can be designed to cover the entire surface of the embossing means so that embossing forms a visible relief pattern on the entire surface of the ii) embossed and densified foamed opacifying layer.

Alternatively, similar to some embodiments of inventive Method I described above, the prefabricated visible relief pattern on a surface of the embossing means can be arranged on only one or more selected portions of that surface, for example along one or more edges so that the resulting embossed visible relief image of the ii) embossed and densified foamed opacifying layer has one or more logos, identifiers, text, or anti-counterfeiting images. Such visible relief patterns can be present in a single instance, or they can be repeated several times on the ii) embossed and densified foamed opacifying layer. Thus, a prefabricated visible relief pattern can be presented on the embossing means in a single instance or repeated several times. In addition, different prefabricated visible relief patterns can be arranged on the surface of the embossing means. The embossing results of using these varied embossing means are corresponding visible relief images in the ii) embossed and densified foamed opacifying layer.

Following the D') embossing and densifying, inventive Method II requires E') disposing and drying a iii) non-foamed functional composition on the ii) embossed and densified foamed opacifying layer (that is, on its back side) to provide a dry coverage of at least 0.5 g/m$^2$ and up to and including 10 g/m$^2$. This E') disposing and drying used therein are the same as described above for inventive Method I. Similar to Method I, the E') disposing and drying operation can either precede or follow the F') curing operation that is described as follows.

A F') curing operation can be carried out to cure the disposed and dried (iii) non-foamed functional composition, if present, and the ii) embossed and densified foamed opacifying layer on the back side of the i) fabric.

The inventive patterned light-blocking element prepared according to Method II of the present invention has an optical density of greater than 4 or greater than 5, in the regions outside of the recessed regions of the visible relief image in the ii) embossed and densified foamed opacifying layer.

Method III:

In yet another method according to this invention, inventive patterned light-blocking elements can be prepared by features A") through G"), in order unless otherwise indicated. Steps or features A"), B"), and C") are carried out in the same manner as features A'), B'), and C'), respectively, as described above for inventive Method II.

In feature D"), the dried foamed opacifying layer is densified to reduce its thickness by at least 20 volume % compared to its original thickness, while the i) fabric having no prefabricated visible relief pattern on either surface, and having the dried foamed opacifying layer disposed on its back side is in intimate contact between a pair of pressure rollers, to provide a densified foamed opacifying layer on the back side of the i) fabric. The temperature and pressure conditions for this D") densifying operation are the same as those described above for densifying in inventive Methods I and II. However, there is no embossing purposely carried out in D").

Similar to E') of inventive Method II described above, E") comprises disposing and drying a iii) non-foamed functional composition on the densified foamed opacifying layer to provide a dry coverage of at least 0.5 g/m² and up to and including 10 g/cm² using a suitable non-foamed functional composition formulation as described above. Similar to inventive Method II, the E") disposing and drying can either precede or immediately follow the F") curing operation described as follows.

Thus, the F"') curing of the applied iii) non-foamed functional composition and the densified foamed opacifying layer on the back side of the i) fabric is carried out, to form a cured and densified foamed opacifying layer. This operation can be carried out using the means and conditions described above for F) and F') curing in inventive Methods I and II, respectively.

Lastly, in inventive Method III, G") embossing of the disposed and dried iii) non-foamed functional composition and the cured and densified foamed opacifying layer disposed on the back side of the i) fabric is carried out between a pair of pressure rollers, to provide a visible relief pattern having raised regions and recessed regions in the resulting ii) embossed and densified foamed opacifying layer. Such G") embossing can be carried out using an embossing means that is either one of the pair of pressure rollers or an embossing means as described above for inventive Method II. The embossing means has a prefabricated visible relief pattern that is in intimate contact with the face side of the i) fabric.

This inventive Method III provides a patterned light-blocking element according to the present invention having an optical density greater than 4 (or greater than 5) in the regions outside the recessed regions of visible relief pattern in the ii) embossed and densified foamed opacifying layer.

As in inventive Method II, the embossing pressure roller, embossing sleeve, sheet of embossing fabric, or continuous patterned embossing belt or web can be situated so that a prefabricated visible relief pattern on one surface thereof is in intimate contact with the face side of the i) fabric. This prefabricated visible relief pattern can be designed to cover the entire surface of the embossing means so that embossing forms a visible relief pattern on the entire surface of the ii) embossed and densified foamed opacifying layer.

Alternatively, similar to some embodiments of inventive Method I and inventive Method II described above, the prefabricated visible relief pattern on a surface of the embossing means can be arranged on only one or more selected portions of that surface, for example along one or more edges so that the resulting embossed visible relief image on the ii) embossed and densified foamed opacifying layer provides one or more logos, identifiers, text, or anti-counterfeiting images. Such visible relief patterns can be present in a single instance, or they can be repeated several times on the ii) embossed and densified foamed opacifying layer. Thus, a prefabricated visible relief pattern can be presented on the embossing means in a single instance or repeated several times.

In addition, different prefabricated visible relief patterns can be arranged on the surface of the embossing means. The embossing results of using these varied embossing means are corresponding visible relief images in the ii) embossed and densified foamed opacifying layer.

The face side of the i) fabric can be optionally printed in a suitable manner either or both before or after the operations of any of inventive Methods I, II, and III described above, to provide one or more images on the i) fabric face side. For example, in a "post-printing" operation, images can be applied using inkjet printing, screen printing, or flexographic printing on a patterned light-blocking element made according to the present invention.

The present invention provides at least the following embodiments and combinations thereof, but other combinations of features are considered to be within the present invention as a skilled artisan would appreciate from the teaching of this disclosure:

1. A patterned light-blocking element consisting essentially of:
   i) a fabric having a face side and a back side;
   ii) an embossed and densified foamed opacifying layer that is disposed on the back side of the i) fabric, the ii) embossed and densified foamed opacifying layer having a visible relief pattern of raised regions and recessed regions, such that in low ambient lighting conditions, backlighting impacting the ii) embossed and densified foamed opacifying layer is blocked everywhere except in at least some of the recessed regions of the visible relief pattern, and such that an outline of the visible relief pattern in the ii) embossed and densified foamed opacifying layer is visible when viewed from the face side of the i) fabric; and
   iii) a non-foamed functional composition disposed on the ii) embossed and densified foamed opacifying layer at a coverage of at least 0.5 g/m² and up to and including 10 g/m²,
   wherein the ii) embossed and densified foamed opacifying layer comprises:
   (a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b') a binder matrix that is present in an amount of at least 10 weight % and up to and including 80 weight %;

(c) two or more additives that are present in a total amount of at least 0.0001 weight % and up to and including 50 weight %, the two or more additives comprising at least one foaming surfactant and at least one compound that is a foam stabilizer; and (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm, all amounts of the (a) porous particles, (b') binder material, (c) two or more additives, and (e) opacifying colorant being based on the total weight of the ii) embossed and densified foamed opacifying layer, wherein the iii) non-foamed functional composition comprises: (aa) glass particles or organic polymeric particles having a mode particle size of at least 5 μm and up to and including 100 μm, in an amount of at least 5 weight % and up to and including 99 weight %, based on the total weight of the iii) non-foamed functional composition; and (ad) one or more water-soluble or water-dispersible organic polymeric binders, and wherein the optical density of the patterned light-blocking element is greater than 4 in regions outside of the recessed regions of the visible relief pattern.

2. The patterned light-blocking element of embodiment 1, wherein the recessed regions of the visible relief pattern comprise perforations.

3. The patterned light-blocking element of embodiment 1, wherein the i) fabric has a prefabricated visible relief pattern on its face side and is an embroidered fabric or a Jacquard fabric.

4. The patterned light-blocking element of any of embodiments 1 to 3, wherein the i) fabric has no prefabricated visible relief pattern on either its face side or its back side.

5. The patterned light-blocking element of any of embodiments 1 to 4, wherein the one or more (e) opacifying colorants in the ii) embossed and densified foamed opacifying layer, comprise a carbon black in an amount of 0.002 weight % and up to and including 1 weight %, based on the total weight of the ii) embossed and densified foamed opacifying layer.

6. The patterned light-blocking element of any of embodiments 1 to 5, wherein the one or more (e) opacifying colorants is present in the (a) porous particles in the ii) embossed and densified foamed opacifying element.

7. The patterned light-blocking element of any of embodiments 1 to 6, wherein the iii) non-foamed functional composition comprises (aa) glass particles in an amount of at least 20 weight % and up to and including 80 weight %, based on the total weight of the iii) non-foamed functional composition.

8. The patterned light-blocking element of any of embodiments 1 to 7, wherein the iii) non-foamed functional composition further comprises one or more of a tinting material, an (af) untreated synthetic silica, a thickener, a (ab) lubricant, a biocide, and a (ag) coating aid having a hydrophilic-lipophilic balance number of at least 5.

9. The patterned light-blocking element of any of embodiments 1 to 8, wherein the weight ratio of the (aa) glass particles or organic polymeric particles to the (ad) water-soluble or water-dispersible organic polymeric binder is at least 10:1 and to and including 1:5.

10. The patterned light-blocking element of any of embodiments 1 to 9, wherein the (aa) glass particles are hollow glass particles having an average particle size of at least 20 μm and up to and including 60 μm and are present in an amount of at least 20 weight % and up to and including 80 weight %, based on the total weight of the iii) non-foamed functional composition.

11. The patterned light-blocking element of any of embodiments 1 to 10, wherein the (ad) one or more water-soluble or water-dispersible organic polymeric binders are each self-crosslinkable.

12. The patterned light-blocking element of any of embodiments 1 to 11, wherein the ii) embossed and densified foamed opacifying layer is the only foamed layer in the light-blocking patterned element.

13. The patterned light-blocking element of any of embodiments 1 to 12, wherein the i) fabric is composed of a polyester, nylon, or cotton.

14. The patterned light-blocking element of any of embodiments 1 to 13, wherein the (a) porous particles in the ii) embossed and densified foamed opacifying layer are comprised of a continuous polymeric phase comprising one or more cellulosic polymers having a $T_g$ of at least 100° C. and up to and including 170° C., and the (a) porous particles have a mode particle size of at least 3 μm and up to and including 40 μm.

15. The patterned light-blocking element of any of embodiments 1 to 14, wherein the one or more (e) opacifying colorants in the ii) embossed and densified foamed opacifying layer comprises a carbon black that is present in the discrete pores of the (a) porous particles.

16. The patterned light-blocking element of any of embodiments 1 to 15, wherein the (c) two or more additives comprise any of a tinting colorant, fire retardant, biocide, thickener, and optical brightener.

17. The patterned light-blocking element of any of embodiments 1 to 16, further comprising a printed image on the face side of the i) fabric.

18. The patterned light-blocking element of any of embodiments 1 to 17, comprising the visible relief pattern on only a selected portion of the ii) embossed and densified foamed opacifying layer.

19. The patterned light-blocking element of any of embodiments 1 to 17, comprising the visible relief pattern on the entire surface of the ii) embossed and densified foamed opacifying layer.

20. The method of claim any of embodiments 1 to 19, wherein the ii) embossed and densified foamed opacifying layer has a dry coverage of less than or equal to 10 ounces (mass)/yard² (or less than or equal to 339.08 g/m²).

The following Examples are provided to illustrate the practice of this invention and are not meant to be limiting in any manner. The following materials were used in the Examples.

Materials Used in the Following Examples

COATOSIL™ 77 is nonionic organo-modified trisiloxane surfactant (coating aid) that was obtained from Momentive Performance Materials.

Xanthan gum was obtained under the tradename Kelzan (manufactured by Kelco Inc.).

Hollow glass particles were obtained from 3M Corporation under the tradename iM16K. They had an average particle size of 20 μm and a density of 0.46 g/cm³.

The i) fabric samples used in the Examples below were composed of either (1) a heavily embroidered polyester that had a weight of about 280-380 g/m² (identified below as "S1") that is a i) fabric that had face and back sides and a prefabricated visible relief pattern on the face side; or (2) a plain weave polyester that is also a i) fabric having face and back sides but which had no prefabricated visible relief pattern on either the face side or back side, and had a weight of about 50-100 g/m² (identified below as "S2").

The foamable aqueous composition (CF drapery compound) was made from a formulation comprising: a self-crosslinking copolymer (P1) derived from n-butyl acrylate, ethyl acrylate, and N-methylol acrylamide using a known procedure, and having a glass transition temperature ($T_g$) of approximately −25° C. as the (b) binder material from which the (b') matrix material was derived; (c) additives titanium dioxide; clay filler; a fire retardant; a foaming surfactant; and a foam stabilizing agent. The self-crosslinking copolymer P1 was also used as the (iv) water-soluble or water-dispersible organic polymeric binder in the non-foamed functional composition formulations.

Measurements:

The mode particle size of the (a) porous particles was measured using a Sysmex FPIA-3000 Flow Particle Image Analyzer available from Malvern Panalytical. The particle size of the dispersed pigments was determined using light scattering.

The porosity of the (a) porous particles was measured using a modified version of the known mercury intrusion porosimetry method described above.

Preparation of Porous Particles:

The porous particles (identified hereinafter as "P") used in the Invention Examples containing a polymer derived from cellulose acetate butyrate as a continuous polymeric phase, discrete pores, and carbon black as the (e) opacifying colorant were prepared as described in U.S. Pat. No. 9,963,569 (noted above), the preparation being incorporated herein by reference. The resulting (i) porous particles had a particle size of 5 μm, a porosity of 50.6%, and a moisture content of 56%.

Forming of Nonfoamed Functional Composition Formulation:

Xanthan gum as a thickener was stirred into water until it was hydrated. It was then stirred again into solution. The organic polymeric binder P1 (50 weight %) was added to this solution as a (ad) water-soluble or water-dispersible organic polymeric binder. COATOSIL™ ™ 77 (wetting surfactant or coating aid) was then added with gentle stirring, followed by addition of the (aa) hollow glass particles. In the resulting dispersion, the (ad) water-soluble or water-dispersible organic polymeric binder P1 was at 0.5 weight %, the (aa) hollow glass particles were at 2 weight %, the xanthan gum thickener was at 0.1 weight % of the solution, and the COATOSIL™ 77 coating aid was at 0.2 weight %, all based on the total weight in the non-foamed functional composition formulation.

This non-foamed functional composition formulation was sprayed and dried as described in Examples 1-3, to form non-foamed functional composition, using nozzles under fluid pressure to create non-foamed functional composition formulation drops of a desired size on the ii) embossed and densified foamed opacifying layer provided on the back side of the i) fabric.

Preparation of Foamable Aqueous Opacifying Compositions and Foamed Aqueous Opacifying Compositions:

A foamable aqueous opacifying composition containing porous particles P was prepared by combining 80 grams of porous particles P with 1470 grams of CF drapery compound (that contains a sulfosuccinamide as a foaming surfactant and ammonium stearate as a foam stabilizing agent). Porous particles P were dispersed into the mixture by stirring with a Cowles blade at ambient temperature for 30-60 minutes. The resulting foamable aqueous opacifying composition was used to prepare a foamed aqueous opacifying composition under pressure using an Oakes 2M Laboratory Mixer Model 2MBT1A.

Example 1: Inventive Method I

The resulting foamed aqueous composition, having a foam density of 0.2 g/cm³, was coated [or disposed as in operation B)] onto the back side of the A) provided i) fabric S1 having a prefabricated visible relief pattern described above on the face side, using a coating gap of 0.05 inch (0.13 cm) set at the highest features of the prefabricated visible relief pattern, dried [operation C)] at a temperature of from 85° C. to 120° C., and crushed ("densified") between a pair of hard pressure rollers under a pressure within the range of 3.5 kN/m to 70 kN/m [operation D)]. On the resulting ii) self-embossed and densified (and dried) foamed opacifying layer on the back side of the i) fabric S1, the described non-foamed functional composition formulation was applied and dried [operation E)], and further cured [operation F)] at 160° C. for 2 minutes to crosslink the (b) binder material to form the (b') binder matrix in the ii) embossed and densified foamed opacifying layer. The resulting patterned light-blocking element of the present invention exhibited an optical density (OD) of 7.2 in the regions outside of the recessed regions of the visible relief pattern in the dry ii) embossed and densified foamed opacifying layer that had a dry weight of 216 g/m².

Figure 1:
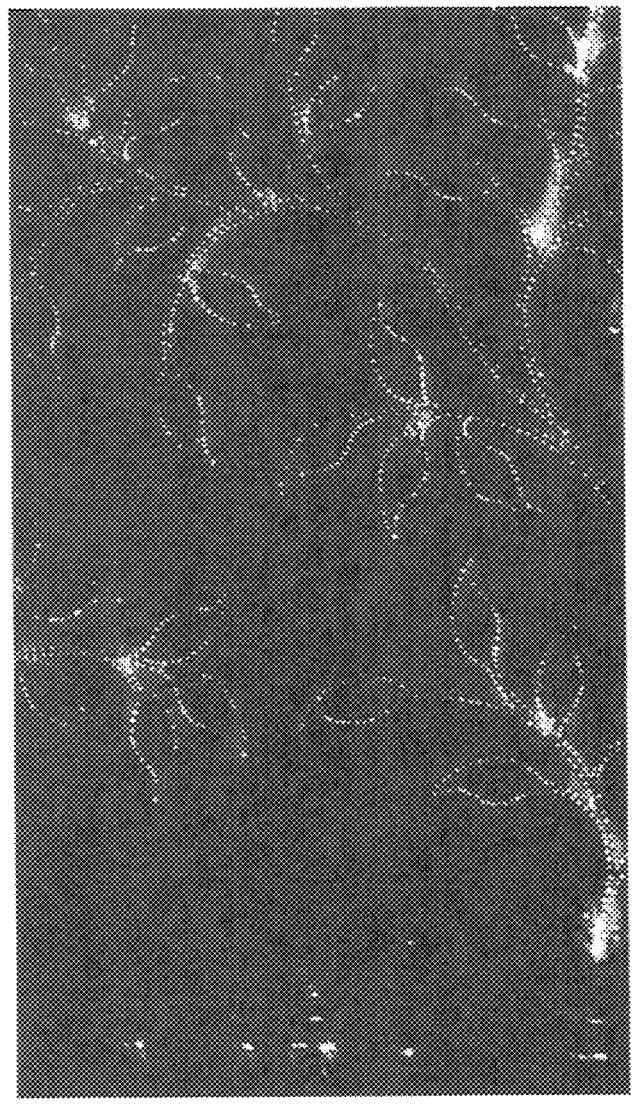
FIG. 1 is a black-and-white image of a backlit inventive patterned light-blocking element as viewed in a dark or dimly lit place from the face side of the i) fabric, which inventive patterned light-blocking element was prepared as described in Example 1 below, using inventive Method I.

FIG. 1 shows a backlit image of the visible relief image in this inventive patterned light-blocking element as viewed in a dimly lit place from the face side of the i) fabric S1. FIG. 2 shows the face side of the same element by viewing i) fabric S1 in ambient room light. A skilled worker in the art can easily see the prefabricated visible relief pattern of the i) fabric that has been self-embossed on the ii) embossed and densified foamed opacifying layer disposed on the back side of the i) fabric, such that light can come through the recessed regions in a back lit situation.

Example 2: Inventive Method II

In this example, the A'), B'), and C') operations were carried out as in Example 1 except that the i) fabric used in A') was S2, a plain fabric material having no visible raised features (that is, no prefabricated visible relief pattern) on either its face side or its back side. During the D') embossing and densifying operation like that described for Example 1, a sheet of the S1 material (described above) was used as an embossing means (as a "sheet of embossing fabric") for convenience in place of a continuous embossing belt or web. The i) fabric having the dried foamed opacifying layer on its back side and the noted embossing means were introduced into the pressure rollers nip. The face side of the sheet of the embossing fabric S1 was in intimate contact with the face side of the i) fabric S2 that was coated with the dried foamed opacifying layer on its back side.

The E') and F') operations were carried out in the listed order, similarly to the E) and F) operations described above in Example 1. The resulting inventive patterned light-blocking element exhibited an optical density (OD) of 6 in the regions outside of the recessed regions of the visible relief pattern in the ii) embossed and densified foamed opacifying layer that was present at a weight of 200 g/m² on the back side of the i) fabric.

Figure 3:
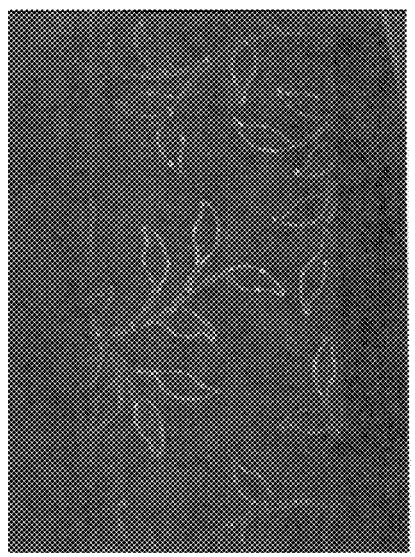
FIG. 3 is a black-and-white image of another backlit inventive patterned light-blocking element as viewed in a dark or dimly lit place from the face side of a i) fabric not having a prefabricated visible relief pattern, which inventive patterned light-blocking element was prepared as described in Example 2 below, using inventive Method II.

FIG. 3 shows the resulting inventive patterned light-blocking element as it is backlit and viewed in a dimly lit environment from the face side of the i) fabric S2, clearly showing the visible relief pattern present in the ii) embossed and densified foamed opacifying layer. A skilled worker in the art can easily see this visible relief pattern as light comes through the recessed regions of the ii) embossed and densified foamed opacifying layer in a back lit situation.

Example 3: Inventive Method III

In this example, the A"), B"), C"), D"), and E") operations were carried out similarly to those in Example 1 except that the i) fabric used in the A") operation was also the i) fabric S2, a plain fabric having no prefabricated visible relief pattern on either the face side or back side. After the final F") curing carried out similarly to operation F') described in Example 1, a sample sheet the embossing fabric S1 was used as the embossing means for convenience in place of a continuous embossing belt or web. This embossing means and the dried, densified, and cured, foamed opacifying layer on the back side of the i) fabric S2 were introduced into the nip of a pair of pressure rollers for embossing with the prefabricated visible relief pattern on the face side of the embossing means S1 in intimate contact with the face side of the coated i) fabric S2. The resulting inventive patterned light-blocking element exhibited an optical density (OD) of 5.7 in the regions outside of the recessed regions of the visible relief pattern formed in the ii) embossed and densified foamed opacifying layer at a weight of 196 g/m².

Figure 4:
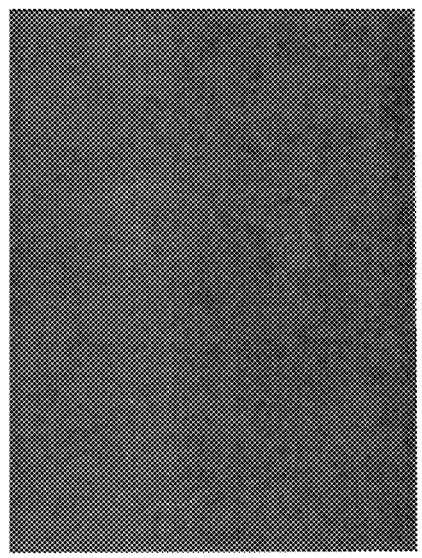
FIG. 4 is a black-and-white image of yet another backlit inventive patterned light-blocking element as viewed in a dark or dimly lit place from the face side of a i) fabric not having a prefabricated visible relief pattern, which inventive patterned light-blocking element was prepared as described in Example 3 below, using inventive Method III.

FIG. 4 shows the resulting inventive patterned light-blocking element as it is backlit and viewed in a dimly lit environment from the face side of the coated i) fabric S2 clearly showing the visible relief image in the ii) embossed and densified foamed opacifying layer on the i) fabric S2 back side, as provided by the sheet of embossing fabric S1. Although not as pronounced as the visible relief images shown in FIGS. 1 and 3, the outline of the visible relief image can still be seen in FIG. 4. A skilled worker in the art can easily see the prefabricated visible relief pattern on the sheet of embossing fabric S1 was transferred to ii) embossed and densified foamed opacifying layer on the back side of the i) fabric S2 such that light comes through the recessed regions in a back lit situation.

The invention has been described in detail with particular reference to certain preferred embodiments thereof, but it will be understood that variations and modifications can be obtained within the spirit and scope of the invention.

The invention claimed is:

1. A patterned light-blocking element consisting essentially of:
   i) a fabric having a face side and a back side;
   ii) an embossed and densified foamed opacifying layer that is disposed on the back side of the i) fabric, the ii) embossed and densified foamed opacifying layer having a visible relief pattern of raised regions and recessed regions at least some of which recessed regions comprise perforations that go through the face side to the back side of the i) fabric, such that in low ambient lighting conditions, backlighting impacting the ii) embossed and densified foamed opacifying layer is blocked everywhere except in at least some of the recessed regions of the visible relief pattern, and such that an outline of the visible relief pattern in the ii) embossed and densified foamed opacifying layer is visible when viewed from the face side of the i) fabric; and
   iii) a non-foamed functional composition disposed directly on the ii) embossed and densified foamed opacifying layer at a coverage of at least 0.5 g/m² and up to and including 10 g/m²,
   wherein the ii) embossed and densified foamed opacifying layer comprises:
   (a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 µm and up to and including 50 µm and a porosity of at least 20 volume % and up to and including 70 volume %;
   (b') a binder matrix that is present in an amount of at least 10 weight % and up to and including 80 weight %;
   (c) two or more additives that are present in a total amount of at least 0.0001 weight % and up to and including 50 weight %, the two or more additives comprising at least one foaming surfactant and at least one compound that is a foam stabilizer; and
   (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm,
   all amounts of the (a) porous particles, (b') binder material, (c) two or more additives, and (e) opacifying colorant being based on the total weight of the ii) embossed and densified foamed opacifying layer,
   wherein the iii) non-foamed functional composition comprises: (aa) glass particles or organic polymeric particles having a mode particle size of at least 5 µm and up to and including 100 µm, in an amount of at least 5 weight % and up to and including 99 weight %, based on the total weight of the iii) non-foamed functional composition; and (ad) one or more water-soluble or water-dispersible organic polymeric binders, and
   wherein the optical density of the patterned light-blocking element is greater than 4 in regions outside of the recessed regions of the visible relief pattern.

2. The patterned light-blocking element of claim 1, wherein the i) fabric has a prefabricated visible relief pattern on its face side and is an embroidered fabric or a Jacquard fabric.

3. The patterned light-blocking element of claim 1, wherein the i) fabric has a prefabricated visible relief pattern on either its face side or its back side.

4. The patterned light-blocking element of claim 1, wherein the one or more (e) opacifying colorants in the ii) embossed and densified foamed opacifying layer, comprise a carbon black in an amount of 0.002 weight % and up to and including 1 weight %, based on the total weight of the ii) embossed and densified foamed opacifying layer.

5. The patterned light-blocking element of claim 1, wherein the one or more (e) opacifying colorants is present in the (a) porous particles in the ii) embossed and densified foamed opacifying element.

6. The patterned light-blocking element of claim 1, wherein the iii) non-foamed functional composition comprises (aa) glass particles in an amount of at least 20 weight % and up to and including 80 weight %, based on the total weight of the iii) non-foamed functional composition.

7. The patterned light-blocking element of claim 1, wherein the iii) non-foamed functional composition further comprises one or more of a tinting material, an (af) untreated synthetic silica, a thickener, a (ab) lubricant, a biocide, and a (ag) coating aid having a hydrophilic-lipophilic balance number of at least 5.

8. The patterned light-blocking element of claim 1, wherein the weight ratio of the (aa) glass particles or organic polymeric particles to the (ad) water-soluble or water-dispersible organic polymeric binder is at least 10:1 and to and including 1:5.

9. The patterned light-blocking element of claim 6, wherein the (aa) glass particles are hollow glass particles having an average particle size of at least 20 μm and up to and including 60 μm and are present in an amount of at least 20 weight % and up to and including 80 weight %, based on the total weight of the iii) non-foamed functional composition.

10. The patterned light-blocking element of claim 1, wherein the (ad) one or more water-soluble or water-dispersible organic polymeric binders are each self-crosslinkable.

11. The patterned light-blocking element of claim 1, wherein the ii) embossed and densified foamed opacifying layer is the only foamed layer in the light-blocking patterned element.

12. The patterned light-blocking element of claim 1, wherein the i) fabric is composed of a polyester, nylon, or cotton.

13. The patterned light-blocking element of claim 1, wherein the (a) porous particles in the ii) embossed and densified foamed opacifying layer are comprised of a continuous polymeric phase comprising one or more cellulosic polymers having a $T_g$ of at least 100° C. and up to and including 170° C., and the (a) porous particles have a mode particle size of at least 3 μm and up to and including 40 μm.

14. The patterned light-blocking element of claim 1, wherein the one or more (e) opacifying colorants in the ii) embossed and densified foamed opacifying layer comprises a carbon black that is present in the discrete pores of the (a) porous particles.

15. The patterned light-blocking element of claim 1, wherein the (c) two or more additives comprise any of a tinting colorant, fire retardant, biocide, thickener, and optical brightener.

16. The patterned light-blocking element of claim 1, further comprising a printed image on the face side of the i) fabric.

17. The patterned light-blocking element of claim 1, comprising the visible relief pattern on only a selected portion of the ii) embossed and densified foamed opacifying layer.

18. The patterned light-blocking element of claim 1, comprising the visible relief pattern on the entire surface of the ii) embossed and densified foamed opacifying layer.

19. The patterned light-blocking element of claim 1, wherein the ii) embossed and densified foamed opacifying layer has a dry coverage of less than or equal to 10 ounces (mass)/yard$^2$ (or less than or equal to 339.08 g/m$^2$).

20. The patterned light-blocking element of claim 1, wherein the visible relief pattern has a designed pattern.

* * * * *